US008624717B2

(12) United States Patent
Yano et al.

(10) Patent No.: US 8,624,717 B2
(45) Date of Patent: Jan. 7, 2014

(54) IMAGE PROCESSOR, STORAGE MEDIUM STORING AN IMAGE PROCESSING PROGRAM AND VEHICLE-MOUNTED TERMINAL

(75) Inventors: Katsutoshi Yano, Kawasaki (JP); Jun Kawai, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 682 days.

(21) Appl. No.: 12/862,950

(22) Filed: Aug. 25, 2010

(65) Prior Publication Data

US 2010/0315214 A1  Dec. 16, 2010

Related U.S. Application Data

(63) Continuation of application No. PCT/JP2008/053273, filed on Feb. 26, 2008.

(51) Int. Cl.
*B60Q 1/00* (2006.01)
(52) U.S. Cl.
USPC ......... 340/435; 340/436; 340/573.1; 340/576
(58) Field of Classification Search
None
See application file for complete search history.

(56) References Cited

FOREIGN PATENT DOCUMENTS

| EP | 0 962 906 A2 | 12/1999 | | |
|---|---|---|---|---|
| JP | 11-353597 | 12/1999 | | |
| JP | 2001-43494 | 2/2001 | | |
| JP | 2001-101566 | 4/2001 | | |
| JP | 2001-155297 | 6/2001 | | |
| JP | 2005-178623 | * | 7/2005 | ............. B60K 35/00 |
| JP | 2007-69777 | 3/2007 | | |
| JP | 2007-102691 | 4/2007 | | |

OTHER PUBLICATIONS

International Search Report for PCT/JP2008/053273, mailed Apr. 22, 2008.

* cited by examiner

*Primary Examiner* — Mohammad Ghayour
*Assistant Examiner* — Brian Wilson
(74) *Attorney, Agent, or Firm* — Staas & Halsey LLP

(57) ABSTRACT

An image processor (3) includes: an image input unit (7) that obtains an image captured by an imaging device (2) installed on a vehicle; a vehicle information input unit (8) that obtains the distance between the vehicle and a road junction or curve from a navigation system (5); a recording unit (15) in which imaging information and driver information are pre-stored; a magnifying object recognition unit (9) that recognizes a certain magnifying object in the obtained captured image; and a composing unit (11) that produces, when a magnifying object is recognized, a composite image of an magnified image and the captured image. The composing unit (11) uses the distance obtained by the vehicle information input unit (8) as well as the imaging information and the driver information stored in the recording unit (15) to calculate an area in the captured image that is not an image of a blind spot for the driver, and produces the composite image such that the magnified image is superimposed on the non-blind spot area. This allows the driver to perceive information on the blind spot area and on the magnified image through a single action.

11 Claims, 16 Drawing Sheets

IMAGE PROCESSOR, STORAGE MEDIUM STORING AN IMAGE PROCESSING PROGRAM AND VEHICLE-MOUNTED TERMINAL

CROSS-REFERENCE TO RELATED APPLICATION

This application is a continuation based upon and claiming the benefit of priority of the prior International Patent Application No. PCT/JP2008/053273, filed on Feb. 26, 2008, the entire contents of which are incorporated herein by reference.

FIELD

The present invention relates to an image processor that processes an image captured by a vehicle-mounted camera, etc. to make the image displayable to a user.

BACKGROUND

In recent years, systems using vehicle-mounted cameras (e.g., Blind Corner Monitor: BCM) have been introduced for the purpose of preventing collision accidents, etc., upon entry into out-of-sight intersections, T junctions, etc.

In BCM, for example, a blind spot area not directly observable to a driver from the driver seat is captured by a camera installed in the front end or the like of the vehicle and the area is displayed on a vehicle-mounted monitor. With BCM, it is possible to visually assist the driver.

However, when a vehicle enters a road at an angle other than 90°, such as entering an intersection where the intersecting roads are not perpendicular to each other, road conditions on the left and right sides of the vehicle may not be simultaneously displayed on the BCM vehicle-mounted monitor. That is, there may arise blind spots that do not appear even on the BCM monitor. Further, in some cases, utility poles, pedestrians, etc., may become shielding objects, whereby the driver may not be able to grasp the left and right conditions even by looking at the image on the BCM monitor. In such a case, the driver may not be aware of an approaching vehicle, meaning that road safety may not be confirmed to a sufficient degree with BCM alone.

Meanwhile, as a means for preventing accidents, mirrors (corner mirrors) that reflect information on areas that are blind spots for drivers are placed at intersections.

An obstacle detection system using such mirrors installed on roadsides has been proposed (see Japanese Laid-open Patent Publication No. 2007-69777 (Patent document 1), for example). In this system, infrared light is irradiated from a vehicle to a reflector installed on a roadside and the presence or absence of a dangerous object is determined based on an image produced from the infrared light reflected on the reflector. When a dangerous object is present, the system notifies the driver as such.

Further, there has also been proposed a system in which a corner mirror is identified from an image captured by a camera installed in the front end of a vehicle and a magnified image of the corner mirror is displayed on a HUD (Head-Up Display) (see Japanese Laid-open Patent Publication No. 2007-102691 (Patent document 2), for example).

Patent document 1: Japanese Laid-open Patent Publication No. 2007-69777
Patent document 2: Japanese Laid-open Patent Publication No. 2007-102691

However, depending on conditions such as the size, shape and direction of each corner mirror and road width, areas (blind spots) that may not be captured even by corner mirrors may arise. For this reason, drivers may not be able to confirm road safety to a sufficient degree with corner mirrors and their magnified image alone.

As described above, since the situation in blind spot areas changes momentarily, it is necessary for drivers to check at all times both the BCM image and corner mirrors installed on roads or an image thereof. For example, immediately before entering an intersection, the driver may make movements such as taking a look at mirrors placed on the road to check information on blind spot areas captured by the mirrors and taking a look at the monitor to check information on blind spot areas captured by a BCM camera. Such actions are a burden on drivers driving vehicles.

That is, even if the environment for presenting blind spot areas and a magnified image to drivers through BCM and corner mirrors is put into place, when the drivers cannot check information on the blind spots and on the magnified image through a single action (action such as checking the monitor), the benefits of the information are halved.

For this reason, a mechanism that allows drivers to perceive the information on both the blind spot areas and the magnified image through a single action and to make full use of the both information is desired.

SUMMARY

According to an aspect of the invention, the image processor includes: an image input unit that obtains an image captured by an imaging device installed on a vehicle; a vehicle information input unit that obtains a distance between the vehicle and a road junction or curve in a traveling direction of the vehicle based on information received from a vehicle-mounted device installed in the vehicle; a recording unit in which imaging information indicating properties of the imaging device and driver information regarding a visual field of a driver of the vehicle are stored; a magnifying object recognition unit that recognizes a certain magnifying object in the captured image; and a composing unit that produces, when the magnifying object recognition unit recognizes the certain magnifying object, a composite image of a magnified image of the magnifying object and the captured image. The composing unit uses the distance obtained by the vehicle information input unit as well as the imaging information and the driver information stored in the recording unit to determine an area in the captured image that is not an image of a blind spot for the driver, and produces the composite image such that the magnified image is superimposed on the non-blind spot area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWING(S)

DESCRIPTION OF EMBODIMENT(S)

Figure 1:
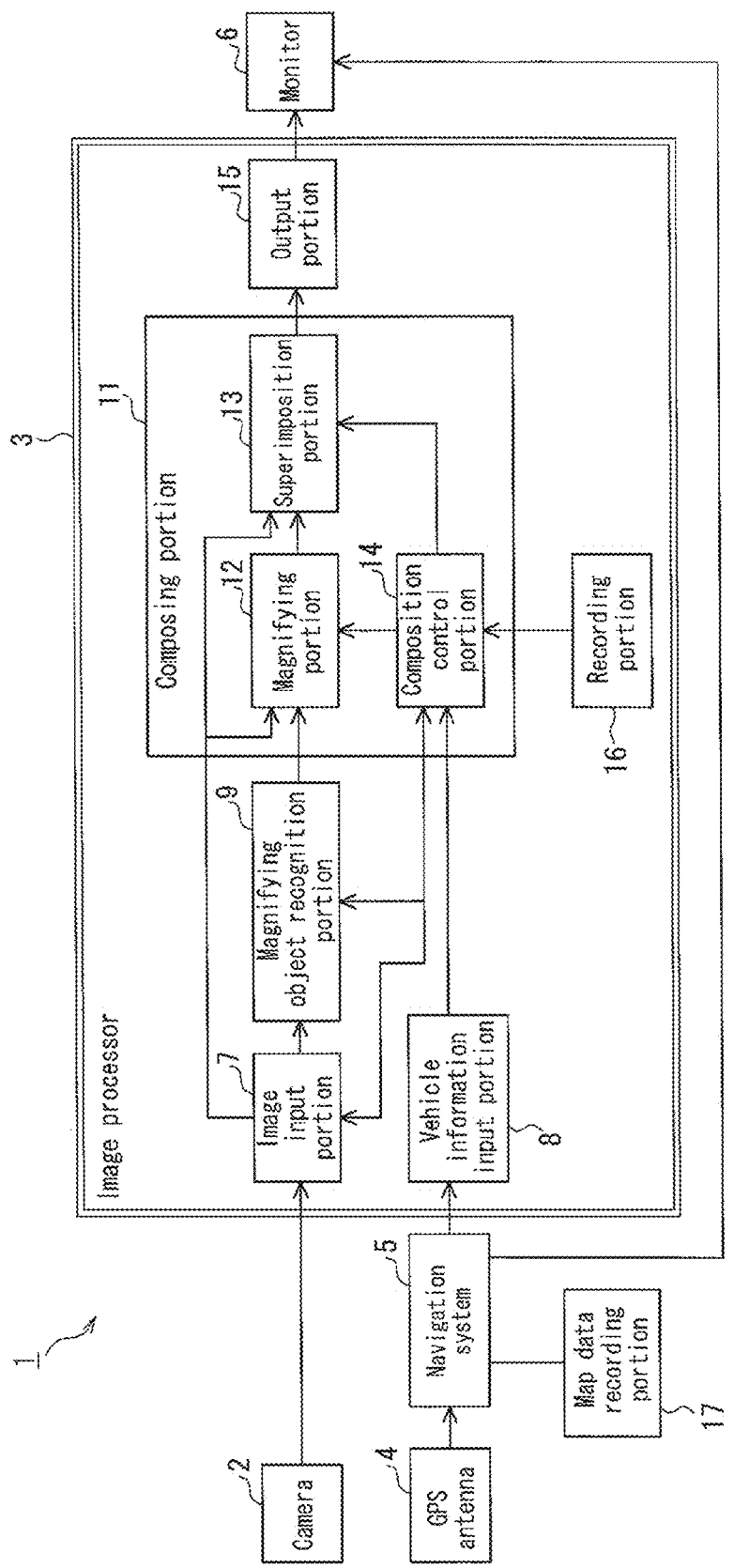
FIG. 1 is a functional block diagram illustrating a configuration of an entire vehicle-mounted system including an image processor.

In the configuration described above, with the use of the distance between the vehicle and the road junction or curve in the traveling direction of the vehicle as well as the properties of the imaging device and the information regarding the visual field of the driver, the composing unit may determine an area in the image captured by the imaging device that is not an image of a blind spot for the driver (i.e., non-blind spot area). Consequently, the composing unit may produce a composite image in which a magnified image of a magnifying object is superimposed on the non-blind spot area in the captured image. When the composite image is displayed, the driver may check the image of blind spots in the captured image and the magnified image of the magnifying object simultaneously simply by glancing at the composite image. In other words, the driver may check both the blind spots captured by the imaging device and the magnifying object through a single action (act of looking at the displayed composite image).

According to the present invention, it allows a drivers to recognize information on blind spot areas and on a magnified image through a single action.

In one embodiment of the invention, the composing unit may use the distance between the vehicle and the junction or the curve and the imaging information to calculate an imaging area to be captured by the imaging device in the vicinity of a position of the junction or the curve, use the distance between the vehicle and the junction or the curve and the driver information to calculate a visual field area to be in the visual field of the driver in the vicinity of the position of the junction or the curve, and use a positional relationship between the imaging area and the visual field to determine a position of the non-blind spot area in the captured image.

As described above, the composing unit calculates both the imaging area of imaging device and the visual field area of the driver at a position based on the junction or curve position. The positional relationship between the two areas seems to correspond to the positional relationship between the captured image and the non-blind spot area. Consequently, with the use of the positional relationship between the imaging area and the visual field area, the composing unit may calculate the non-blind spot area in the captured image with precision.

In one embodiment of the invention, the composing unit may use the distance obtained by the vehicle information input unit to determine a magnification level of the magnified image.

Consequently, the magnification level of the magnified image of road mirrors may be adjusted in accordance with the distance between the vehicle and the junction or curve. As a result, a composite image that allows the driver to check the road mirrors and blind spots in the captured image more easily is produced.

In one embodiment of the invention, the image input unit may further obtain a horizontal rudder angle of the imaging device at a time of capturing the captured image, and the composing unit may use the horizontal rudder angle to calculate the imaging area.

Here, the horizontal rudder angle of the imaging device refers to an amount expressed by a rotating angle of the optical axis of the imaging device installed on the vehicle from a certain position when the optical axis is rotated about the axis of the vertical direction from the certain position within the horizontal plane. Consequently, even with an image captured by an imaging device by rotating the optical axis of the imaging device in the horizontal direction, the composing unit may calculate the non-blind spot area appropriately in accordance with the amount of rotation.

In one embodiment of the invention, the vehicle information input unit may further obtain a value representing a curvature of the curve in the traveling direction of the vehicle, and the composing unit uses the curvature to determine the magnification level of the magnified image.

Consequently, the magnification level of the magnified image of road mirrors may be adjusted in accordance with the curvature of a curve in the traveling direction of the vehicle. As a result, a composite image including a magnified image of road mirrors having an appropriate size according to the curvature of a curve is produced.

In one embodiment of the invention, the vehicle information input unit may further obtain information indicating a frequency of occurrence of accidents at the junction or the curve, and the composing unit may use the frequency of occurrence of accidents to determine the magnification level of the magnified image.

Consequently, the magnification level of the magnified image of road mirrors may be adjusted according to the frequency of occurrence of accidents at a junction or curve in the traveling direction of the vehicle. As a result, a composite image including a magnified image of road mirrors having an appropriate size according to the degree of risk at a junction or curve is produced.

In one embodiment of the invention, the image processor may work in conjunction with a navigation system installed in the vehicle, and the vehicle information input unit may obtain the distance between the vehicle and the road junction or curve in the traveling direction of the vehicle from the navigation system installed in the vehicle. By configuring the image processor to be able to work in conjunction with the navigation system in this way, it is possible to perform processing in an efficient manner.

In one embodiment of the invention, the vehicle information input unit may further obtains information indicating presence or absence of the magnifying object at the junction or the curve from the navigation system, and the magnifying object recognition unit may recognize a certain magnifying object in the obtained captured image when the magnifying object is present at the junction or the curve.

As described above, by determining whether to recognize the magnifying object or not based on information indicating the presence or absence of the magnifying object at the junction or curve, the recognition may be performed precisely and efficiently.

In one embodiment of the invention, when the distance becomes equal to or less than a certain distance, the magnifying object recognition unit may recognize a certain magnifying object in the obtained captured image.

According to an aspect of the invention, an image processing method executed by a computer includes: obtaining an image captured by an imaging device installed on a vehicle; obtaining a distance between the vehicle and a road junction or curve in a traveling direction of the vehicle based on information from a vehicle-mounted device installed in the vehicle; reading and obtaining imaging information indicating properties of the imaging device and driver information regarding a visual field of a driver of the vehicle stored in a recording unit accessible to the computer; recognizing a certain magnifying object in the captured image; and producing, when the certain magnifying object is recognized in the magnifying object recognition, a composite image of a magnified image of the magnifying object and the captured image. In the production of the composite image, the obtained distance as well as the obtained imaging information and driver information are used to determine a non-blind spot area in the captured image that does not include an image of a blind spot for the driver, and the composite image is produced such that the magnified image is superimposed on the non-blind spot area.

According to an aspect of the invention, a storage medium storing an image processing program that causes a computer to perform processing of: obtaining an image captured by an imaging device installed on a vehicle; obtaining a distance between the vehicle and a road junction or curve in a traveling direction of the vehicle based on information from a vehicle-mounted device installed in the vehicle; obtaining imaging information indicating properties of the imaging device and driver information regarding a visual field of a driver of the vehicle stored in a recording unit accessible to the computer; recognizing a certain magnifying object in the captured image; and producing, when the certain magnifying object is recognized in the magnifying object recognition, a composite image of a magnified image of the magnifying object and the captured image. In the production of the composite image, the obtained distance as well as the obtained imaging information and driver information are used to determine a blind-spot area in the captured image that does not include an image of a blind spot for the driver, and the composite image is produced such that the magnified image is superimposed on the non-blind spot area.

According to an aspect of the invention, a vehicle-mounted terminal is capable of working in conjunction with an imaging device installed on a vehicle, and the vehicle-mounted terminal includes: a navigation system having a function of identifying a position of the vehicle and including a map data recording unit in which road information including a position of each road junction or curve is stored; an image input unit that obtains an image captured by the imaging device; a vehicle information input unit that obtains a distance between the vehicle and a road junction or curve in a traveling direction of the vehicle with the use of the position of the vehicle identified by the navigation system and the road information; a recording unit in which imaging information indicating properties of the imaging device and driver information regarding a visual field of a driver of the vehicle are stored; a magnifying object recognition unit that recognizes a certain magnifying object in the captured image; a composing unit that produces, when the magnifying object recognition unit recognizes the certain magnifying object, a composite image of a magnified image of the magnifying object and the captured image; and a display unit that displays the composite image produced by the composing unit.

Hereinafter, one embodiment of the present invention will be described with reference to the drawings.

<Overview of Configuration of Vehicle-Mounted System>

FIG. 1 is a functional block diagram illustrating a configuration of an overall vehicle-mounted system, including an image processor according to this embodiment. A vehicle-mounted system 1 illustrated in FIG. 1 is a system installed in a vehicle and the system includes a camera (imaging device) 2, an image processor 3, a GPS antenna 4, a navigation system (navigation system unit) 5 and a monitor (display unit) 6. The camera 2 is placed at a position from which a front view from the vehicle may be captured. The image processor 3 receives and processes an image of the front view captured by the camera 2 and outputs the processed image to the monitor 6.

The GPS antenna 4 receives radio waves from a plurality of GPS artificial satellites (GPS satellites). The navigation system 5 measures the current position of the vehicle based on the radio waves received by the GPS antenna 4. The navigation system 5 produces navigation information using the current position and map data pre-stored in a map data recording unit 17 and displays the produced information on the monitor 6. In addition to a road map (including information on road widths and positions of junctions and curves), the map data also includes data on a variety of facilities, landmarks and the like. The map data is used by the navigation system 5 in displaying the current position, route search and route guidance, for example.

The image processor 3 receives information on intersections or curves in the traveling direction, the current position of the vehicle and the like from the navigation system 5 and use them in image processing. The image processor 3 includes an image input unit 7, a vehicle information input unit 8, a magnifying object recognition unit 9, a composing unit 11, an output unit 15 and a recording unit 16. The composing unit 11 includes a magnifying unit 12, a superimposition unit 13 and a composition control unit 14. Details on the inner workings of the image processor 3 will be described later.

<Mounting Example on Vehicle>

Figure 2A:
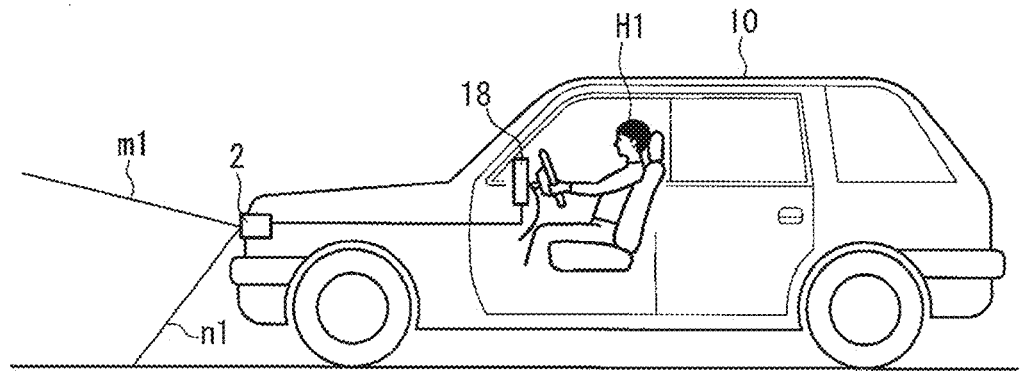
FIG. 2A is a simplified perspective view illustrating a vehicle 10 equipped with the vehicle-mounted system.
Figure 2B:
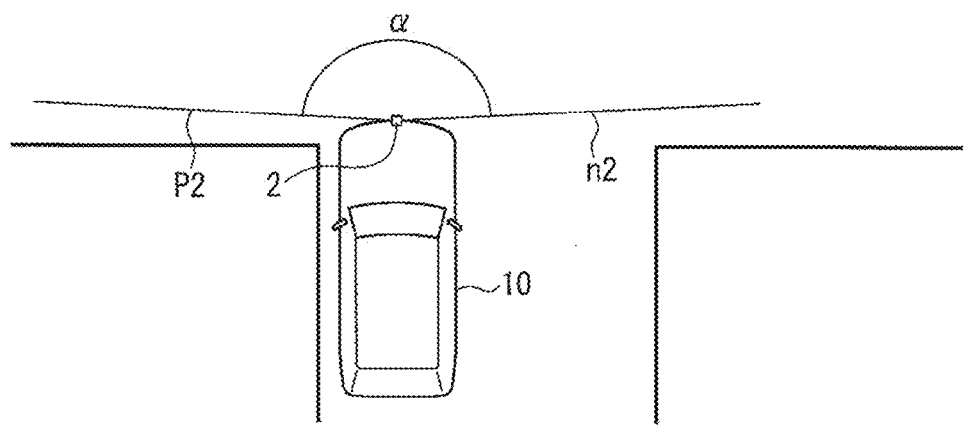
FIG. 2B is a diagram illustrating a horizontal area to be captured by a vehicle-mounted camera.

FIGS. 2A and 2B illustrate an exemplary configuration of the vehicle-mounted system 1 when the system is mounted on a vehicle. FIG. 2A is a perspective view illustrating a schematic configuration of a vehicle 10 on which the vehicle-mounted system 1 is mounted. The camera 2 is installed in the front end of the vehicle 10 and is connected to a housing (vehicle-mounted terminal) 18. The navigation system 5, the image processor 3 and the monitor 6 are integrated to form the housing 18. The monitor 6 is formed at a position that may be observed by a driver H1 in the vehicle 10.

For example, the housing 18 includes a computer including a CPU, recording media (RAM, ROM, HDD, etc.), a display, a power circuit, bus lines for connecting these components, and the like. The navigation system 5 as well as the image input unit 7, the vehicle information input unit 8, the magnifying object recognition unit 9, the composing unit 11 and the output unit 15 of the image processor 3 are each functionally implemented via execution of a certain program by the CPU. The program for implementing each of the functions and a recording medium in which the program is stored are also one example of the embodiment of the present invention. Herein, the recording medium is non-transitory tangible medium and dose not include transitory medium such as propagating signal per se. Further, the recording unit 16 and the map data recording unit 17 are implemented via the recording medium included in the computer.

Note the example illustrated in FIG. 2A does not limit forms in which the vehicle-mounted system 1 is mounted on the vehicle. For example, the navigation system 5 and the monitor 6 may form a single housing, and the image processor 3 may be installed as an ECU (Electronic Control Unit) to be connected to the camera 2 and the housing. Further, the image processor 3 may be formed with such a chip as a 1394 controller LSI. Further, the monitor 6 may be formed with an instrumental panel, an HUD or the like. In FIG. 2A, a range between two lines m1 and n1 indicates an area to be captured by the camera 2 in the vertical direction.

FIG. 2B is a diagram illustrating an area to be captured by the camera 2 of the vehicle 10 in the vertical direction when the vehicle 10 is about to enter an intersection. In FIG. 2B, an area between two lines p2 and n2 indicates a horizontal area to be captured by the camera 2. In the example illustrated in FIG. 2B, an angle α between the two lines p2 and n2 is a little less than 180° (hereinafter, an area expressed in angle, which is captured by the camera and displayed on the monitor 6, such as the angle α, will be referred to as a monitorable angle). Here, the monitorable angle α of the camera 2 is close to 180°. Thus, when the front end of the vehicle 10 enters the intersection, an image of the left and right sides of the road perpendicular to the traveling direction of the vehicle 10 is to be captured by the camera 2 and displayed on the monitor 6. Further, since the camera is positioned in the front end of the vehicle 10, the driver H1 may check blind spots ahead of the vehicle 10 right away when the vehicle 10 moves forward.

Figure 3:
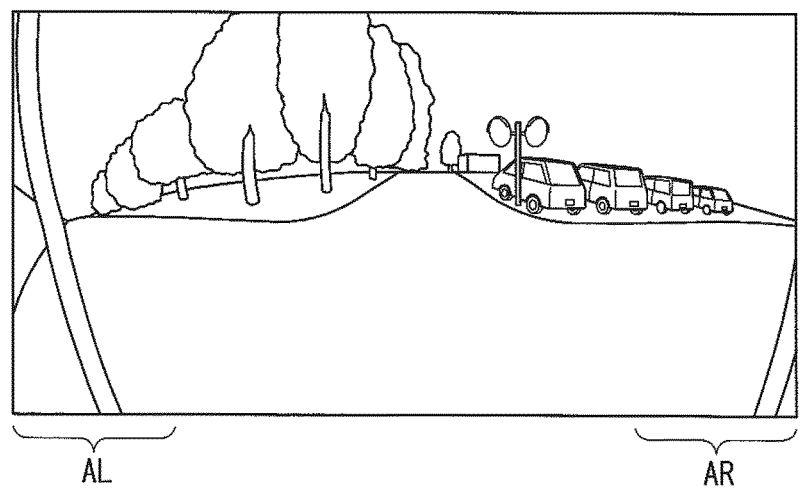
FIG. 3 is a diagram illustrating an exemplary image captured by the vehicle-mounted camera.

FIG. 3 is a diagram illustrating an exemplary image captured by the camera 2 of the vehicle 10 that is about to enter an intersection. In the image illustrated in FIG. 3, areas that are blind spots for the driver H1 are in a right end portion AR and a left end portion AL.

In the example illustrated in FIG. 2B, the left and right sides of the vehicle 10 are captured by a single camera whose horizontal monitorable angle is close to 180°. Alternatively, two cameras each having a monitorable angle of about 90° may be installed on the vehicle 10 to face the left and right directions, respectively. Further, by placing three cameras in the front end of the vehicle in the front, left and right directions, the monitorable range may be increased to more than 180°. The number of cameras to be installed is not particularly limited and is determined in view of the cost, image viewability and the like as needed.

Further, the camera installation position is not limited to the position illustrated in FIGS. 2A and 2B. For example, the camera may also be installed on the hood, rearview mirror, door mirror, etc., of the vehicle 10. Further, in order to capture a rearview image when the vehicle 10 moves backward, the camera may be installed on the rear of the vehicle 10. In this embodiment, a case of capturing a front view image by a single camera will be described as an example.

<Exemplary Output Image from Image Processor>

Figure 4:
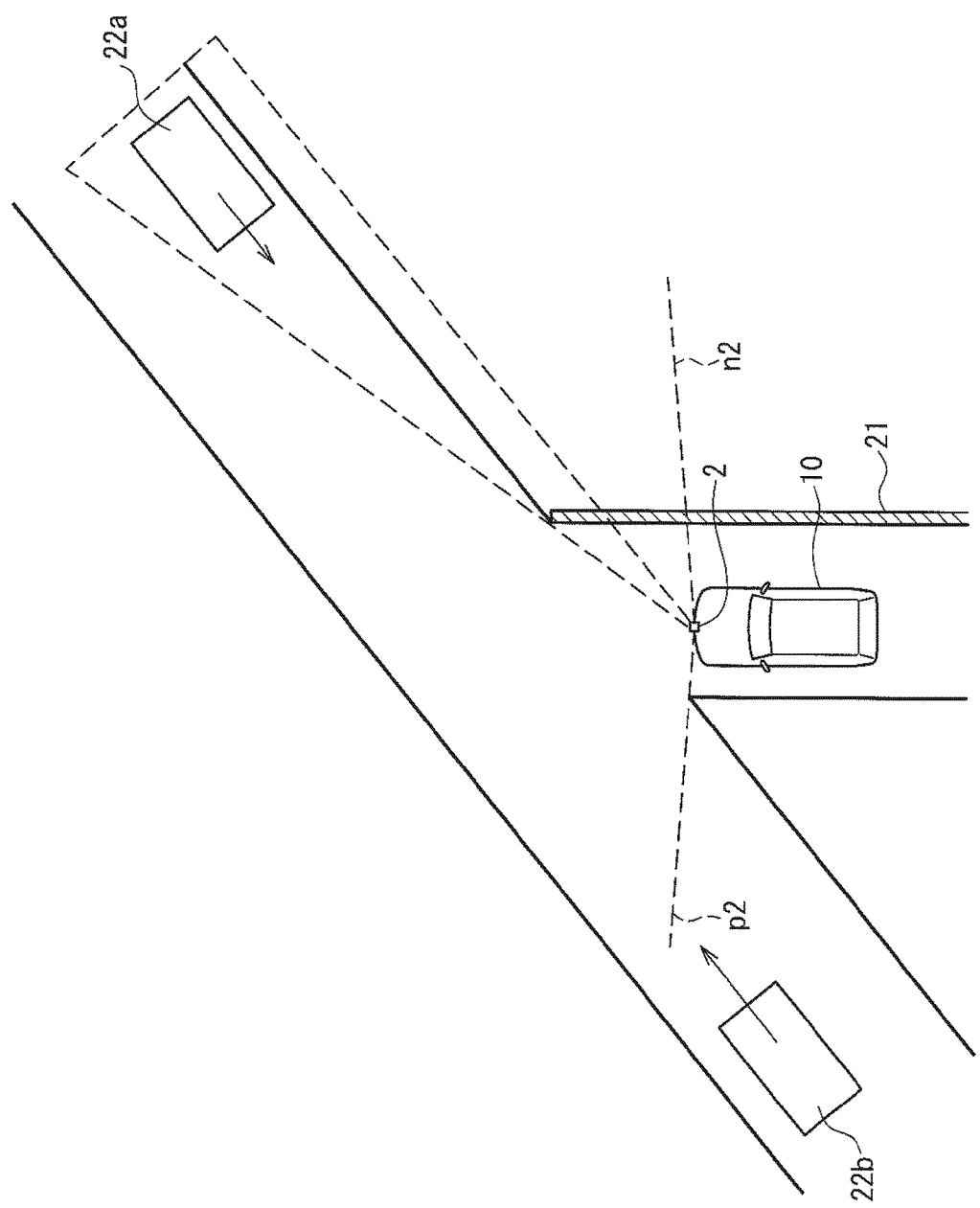
FIG. 4 is a diagram illustrating an example when the vehicle enters a road at an angel other than 90°.

When the vehicle 10 enters an intersection or T junction, left and right conditions may not be captured by the camera 2 in some cases. For example, as illustrated in FIG. 4, when the vehicle 10 enters a road at an angle other than 90° and there is a fence 21 on the right side of the vehicle 10, not the road conditions in the right direction but the fence 21 appears in an image captured by the camera 2 at the right end. That is, because a vehicle 22a approaching from the right side is overshadowed by the fence 21, the vehicle 22a does not appear in the image captured by the camera 2. Also, a vehicle 22b approaching from the left side does not appear in the image captured by the camera 2 unless the vehicle 22b enters into the monitorable angle of the camera 2.

Figure 5:
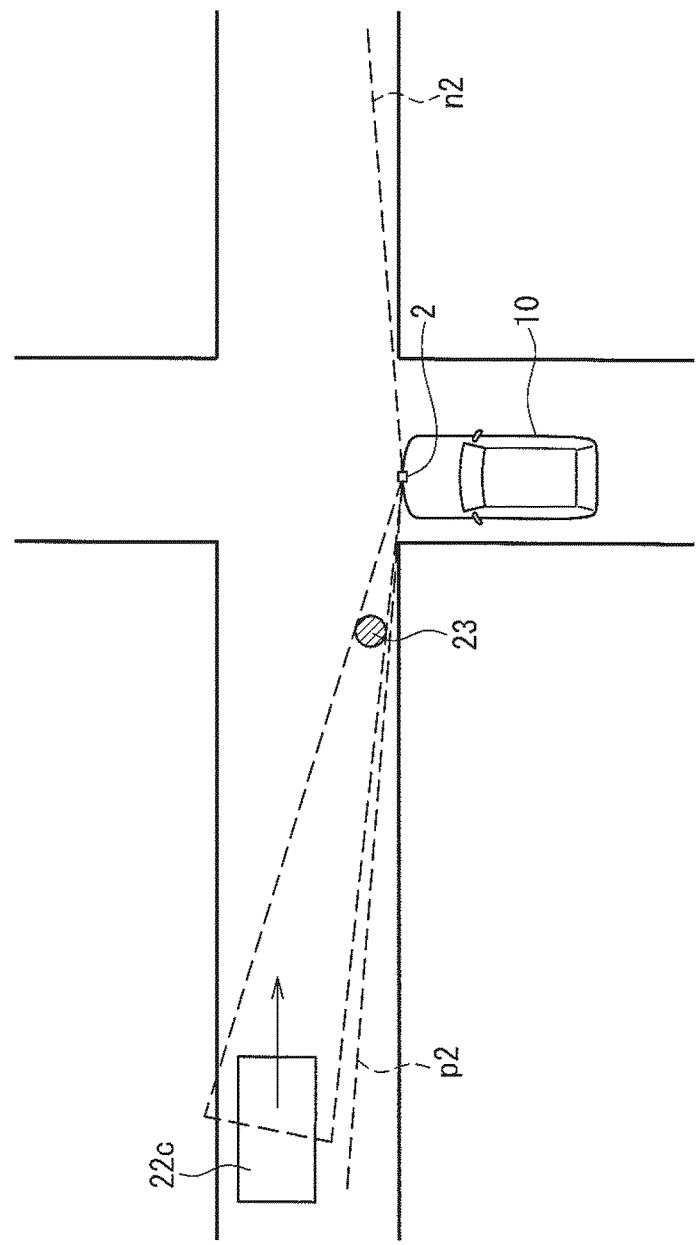
FIG. 5 is a diagram illustrating an example when the vehicle enters an intersection at which a shielding object is present on the left side.

Further, as another example, as illustrated in FIG. 5, also when the vehicle 10 enters an intersection at which a shielding object 23 (e.g., a utility pole or pedestrian) is present on the left side, a vehicle 22c approaching from the left side does not appear in an image captured by the camera 2 because the vehicle 22c is overshadowed by the shielding object 23. In this way, there are situations where road conditions of the left and right sides may not be captured by the camera 2.

Figure 6:
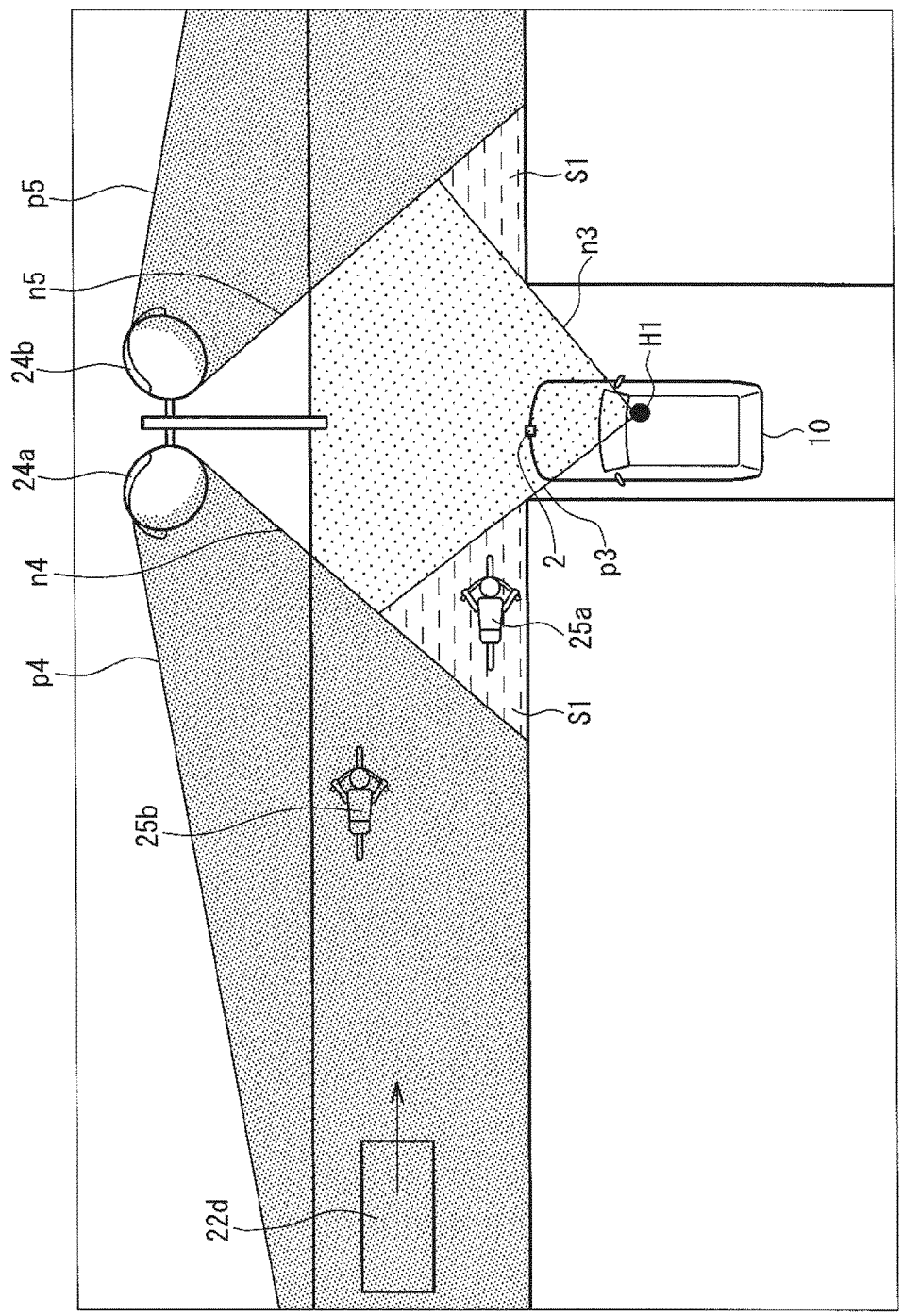
FIG. 6 is a conceptual diagram illustrating an area checkable to a driver with the use of road mirrors.

Meanwhile, the driver H1 may look at a road mirror (commonly known as a curve mirror) placed at an intersection, T junction or curve to check road conditions that are not directly observable to the driver. FIG. 6 is a conceptual diagram illustrating an area where the driver H1 may check with the use of road mirrors when the vehicle 10 is about to enter a T junction. In the example illustrated in FIG. 6, two road mirrors 24a, 24b are placed at the T junction. A range between lines p3 and n3 indicates an area where the driver H1 of the vehicle may check by taking a direct look. The driver H1 may look at the road mirror 24a to check a range between lines p4 and n4 and look at the road mirror 24b to check a range between lines p5 and n5.

In the example illustrated in FIG. 6, areas S1 as blind spots for the driver H1 on the left and right sides are captured by the camera 2 and are displayed on the monitor 6. In this case, the driver H1 may look at the road mirrors and the monitor 6 to check left and right conditions that are not directly observable to the driver H1. The image processor 3 according to this embodiment provides an image that allows the driver H1 to check both the blind spot areas S1 and the areas reflected on the road mirrors 24a, 24b in a situation as illustrated in FIG. 6 by simply looking at the monitor 6, for example.

Figure 7A:
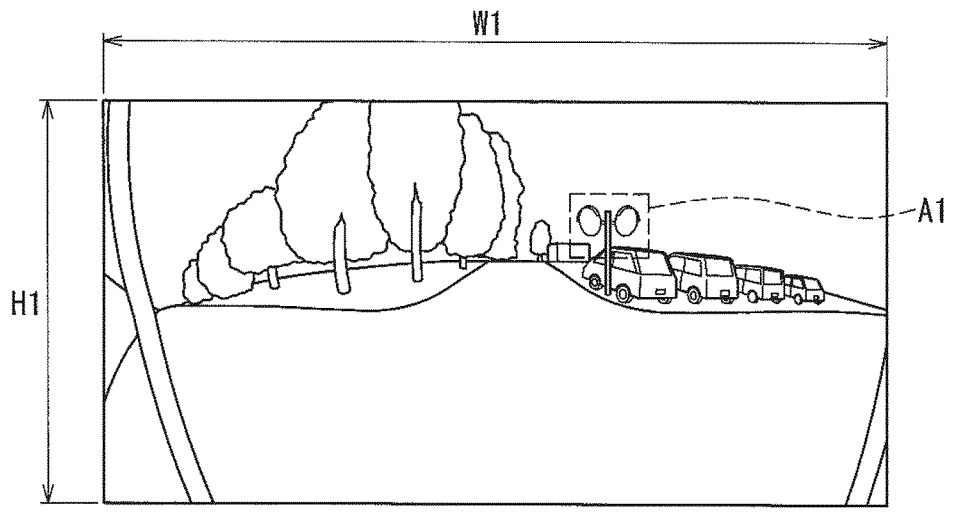
FIG. 7A is a diagram illustrating an exemplary image inputted from the camera to the image processor.
Figure 7B:
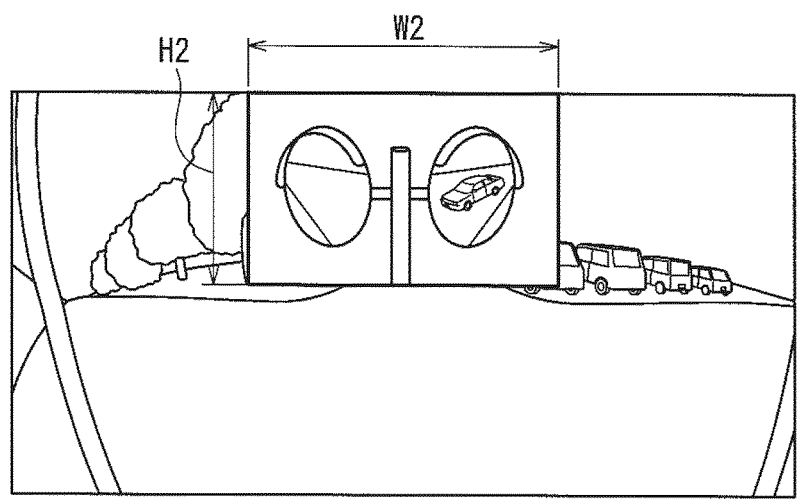
FIG. 7B is a diagram illustrating an exemplary composite image produced by the image processor.

FIG. 7A is a diagram illustrating an exemplary image inputted from the camera 2 to the image processor 3. The image processor 3 produce a composite image by superimposing on the original image a magnified image of a road mirror portion A1 in the image illustrated in FIG. 7A. FIG. 7B is a diagram illustrating an exemplary composite image produced by the image processor 3. As illustrated in FIG. 7B, the image processor 3 may produce an image in which a magnified image is superimposed on a non-blind spot area (area that is not included in the blind spot areas S1) in the original image (FIG. 7A).

In this way, by superimposing a magnified image of road mirrors on the non-blind spot area for the driver H1 in the original captured image and displaying the composite image, the overall blind spot area for the driver H1 may be displayed in a single screen. Hereinafter, exemplary configuration and operation of the image processor 3 capable of performing such image processing will be described in detail.

<Configuration of Image Processor 3>

In the image processor 3 illustrated in FIG. 1, the image input unit 7 obtains image data of a captured image from the camera 2 and makes the data accessible to the magnifying object recognition unit 9 and the composing unit 11. The image input unit 7 subjects the image signals received from the camera 2 to A/D conversion and other necessary conversion processing and records the signals frame by frame in a recording medium accessible to the magnifying object recognition unit 9 and the composing unit 11. The image input unit 7 may also receive image data that has already been subjected to necessary conversion processing, such as A/D conversion.

The magnifying object recognition unit 9 reads the image data obtained by the image input unit 7 frame by frame and determines the presence or absence of an area that may be recognized as a magnifying object (a road mirror in this case) in each frame of the image. When an area that may be recognized as a road mirror is present, the magnifying object recognition unit 9 extracts the data of the area and passes the data to the magnifying unit 12. The magnifying unit 12 magnifies an image of the area to produce a magnified image.

With the use of known image recognition techniques, the magnifying object recognition unit 9 may recognize a road mirror portion in the image. As an example, first, the magnifying object recognition unit 9 uses a Laplacian filter to extract an edge portion in the image. Then, the magnifying object recognition unit 9 matches image data forming the edge portion with pre-stored feature quantity data of a road mirror (e.g., a template of a standard road mirror) and calculates the correlation value. An area in which the correlation value is larger than a threshold value may be determined as a road mirror area.

Further, templates of objects that could be easily misidentified as a road mirror, such as road signs, may be pre-stored as feature quantity data. In this case, the magnifying object recognition unit 9 may be configured not to recognize an object as a road mirror when the correlation value between such templates and image data forming the edge portion is larger than a threshold value. As a result, the precision of the recognition improves. Note that the road mirror recognition is not limited to the example described above.

As described above, magnifying objects recognized by the magnifying object recognition unit 9 are objects that need to be magnified and presented to the driver. That is, objects that provide the driver with information beneficial to the driver in driving vehicle are predefined as magnifying objects. In the example described above, the pre-stored feature quantity data defines road mirrors as magnifying objects. Magnifying objects are not limited to road mirrors and road signs, guideboards and road surface markings (letters (e.g., "STOP") and arrows painted on a road surface) may also be defined as magnifying objects.

The magnifying unit 12 magnifies the image of the road mirror area according to a value representing a magnification level received from the composition control unit 14. The magnifying unit 12 passes the magnified image to the superimposition unit 13.

The superimposition unit 13 superimposes the received magnified image on the frames (hereinafter referred to as the original frames) corresponding to the image data of the captured image obtained by the image input unit 7 to produce a composite image. When performing superimposition, the superimposition unit 13 obtains from the composition control unit 14 information indicating the superimposition position of the magnified image in the original frames, and superimposes the magnified image on the original frames based on the obtained information.

In this way, the composite image produced by the superimposition unit 13 is outputted to the monitor 6 via the output unit 15. Frames in which the magnifying object recognition unit 9 has not found a mirror portion are sent to the output unit 15 without being processed by the superimposition unit 13 and are displayed on the monitor 6.

In the recording unit 16, imaging information indicating the properties of the camera 2 installed on the vehicle 10 and driver information regarding the visual field of the driver H1 of the vehicle 10 are pre-stored. The imaging information includes information used in determining an area to be captured by the camera 2. For example, the imaging information includes such information as the monitorable angle, angle of view, lens properties of the camera 2 and the installation position of the camera 2 on the vehicle 10.

Further, the driver information includes information that enables to estimate the visual field of the driver sitting in the driver seat of the vehicle 10. For example, the driver information includes such information as the position of the driver's eyes in the vehicle 10 and the visual field properties (e.g., effective visual field) of the driver. The driver information is not limited to pre-stored fixed values. For example, the vehicle information input unit 8 may receive information on the visual field of the driver from a vehicle-mounted device (not shown) for monitoring the driver's eye movements and store the information in the recording unit 16 as a piece of the driver information.

The vehicle information input unit 8 obtains the current position of the vehicle 10 and the immediate junction position in the traveling direction of the vehicle 10 from the navigation system 5, calculates the distance between the vehicle 10 and the junction (hereinafter referred to as distance L) and notifies the composition control unit 14 of the calculated distance.

The way to obtain the distance L between the vehicle 10 and the junction is not limited to one described above. The vehicle information input unit 8 may obtain the distance L based on data received from a vehicle-mounted device capable of gathering information for determining the current position. The vehicle-mounted device is not limited to a particular device. For example, the vehicle information input unit 8 may receive data indicating the distance L between the vehicle 10 and the junction from the navigation system 5 or may calculate the distance L using radio waves received by the GPS antenna 4 and the map data stored in the map data recording unit 17. Further, in addition to or in place of the distance between the vehicle 10 and the junction, the vehicle information input unit 8 may obtain the distance between the vehicle and the curve in the traveling direction. Further, the vehicle information input unit 8 may further use information received from a vehicle speed sensor, a vehicle direction sensor, etc., (all of which are not shown) to determine the current position of the vehicle 10.

The composition control unit 14 uses the distance L between the vehicle 10 and the junction as well as the imaging information and the driver information stored in the recording unit 16 to calculate the magnification level of the road mirror area in the image and the position at which the magnified image is superimposed, and notifies the magnifying unit 12 and the superimposition unit 13 of the results, respectively. Here, the composition control unit 14 calculates an image area in the original frames of the captured image, area directly observable to the driver H1 (=a non-blind spot area that does not include an image of a blind spot for the driver H1), and calculates the superimposition position so that the magnified image is superimposed on the non-blind spot area.

For example, the composition control unit 14 uses the distance L and the imaging information to calculate an area to be captured by the camera 2 (imaging area) in the vicinity of a position apart from the vehicle 10 by the distance L. Further, the composition control unit 14 uses the distance L and the driver information to calculate an area to be in the visual field of the driver (visual field area) in the vicinity of the position apart from the vehicle 10 by the distance L. And the composition control unit 14 uses the positional relationship between the imaging area and the visual field area to calculate the non-blind spot area in the original frames of the captured image. The composition control unit 14 may calculate the non-blind spot area such that the positional relationship of the imaging area with the visual field area corresponds to the positional relationship of the non-blind spot area with the original frames of the captured image. Note that the way to calculate the non-blind spot area is not limited to one described above. The composition control unit 14 may determine the non-blind spot area for the driver H1 using the properties of the camera 2, road shape, intersection position, vehicle position, etc.

Further, the composition control unit 14 may use information inputted by the vehicle information input unit 8 to control the operation of the image input unit 7 or the magnifying object recognition unit 9. For example, the composition control unit 14 may control the image input unit 7 and the magnifying object recognition unit 9 to operate only when the distance L is smaller than a certain distance. As a result, the magnifying object recognition unit 9 performs the road mirror recognition every time the vehicle 10 approaches an intersection.

Further, it is not necessary to perform the road mirror recognition every time the vehicle 10 approaches an intersection. For example, by pre-including in the map data of the navigation system 5 information indicating the presence or absence of a magnifying object (a road mirror in this case) at each junction, the vehicle information input unit 8 may be configured to obtained the pre-included information. In this case, the composition control unit 14 may control the magnifying object recognition unit 9 to perform the road mirror recognition when the vehicle 10 approaches a junction with a road mirror. Also, the magnifying object recognition unit 9 may directly receive the pre-included information from the vehicle information input unit 8 to determine whether to perform the road mirror recognition or not.

<Exemplary Operation of Image Processor 3>

Figure 8:
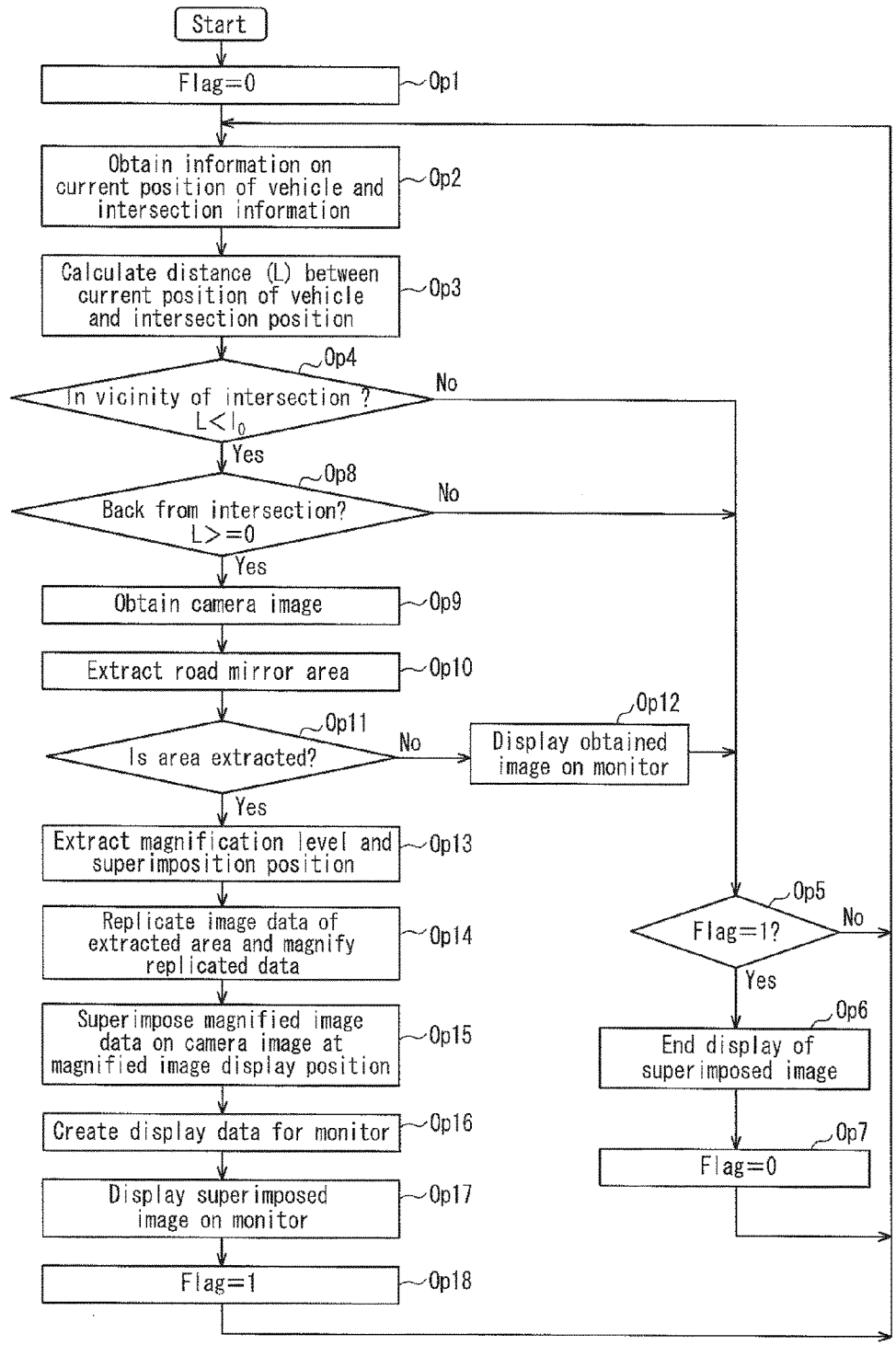
FIG. 8 is a flowchart illustrating an exemplary operation of the image processor.

Next, an exemplary operation of the image processor 3 will be described. FIG. 8 is a flowchart illustrating an exemplary operation of the image processor 3. In the exemplary operation illustrated in FIG. 8, first, the image processor 3 initializes "Flag" (set Flag to 0) indicating whether to output a composite image or not (Op1).

Then, the vehicle information input unit 8 obtains the current position of the vehicle 10 and a position K1 of the closest intersection in the traveling direction of the vehicle 10 from the navigation system 5 (Op2). For example, the current position information and the intersection position K1 are each expressed in latitude and longitude. The vehicle information input unit 8 calculates the distance L between the current position of the vehicle 10 and the intersection position K1 (Op3). The composition control unit 14 is notified of the distance L.

When the distance L is smaller than a threshold value $l_0$, in other words, when the vehicle 10 is in the vicinity of the intersection (L<$l_0$: Yes at Op4) and has not passed the intersection (L≥0: Yes at Op5), the composition control unit 14 causes the image input unit 7 to obtain an image captured by the camera 2 (Op9).

Figure 9:
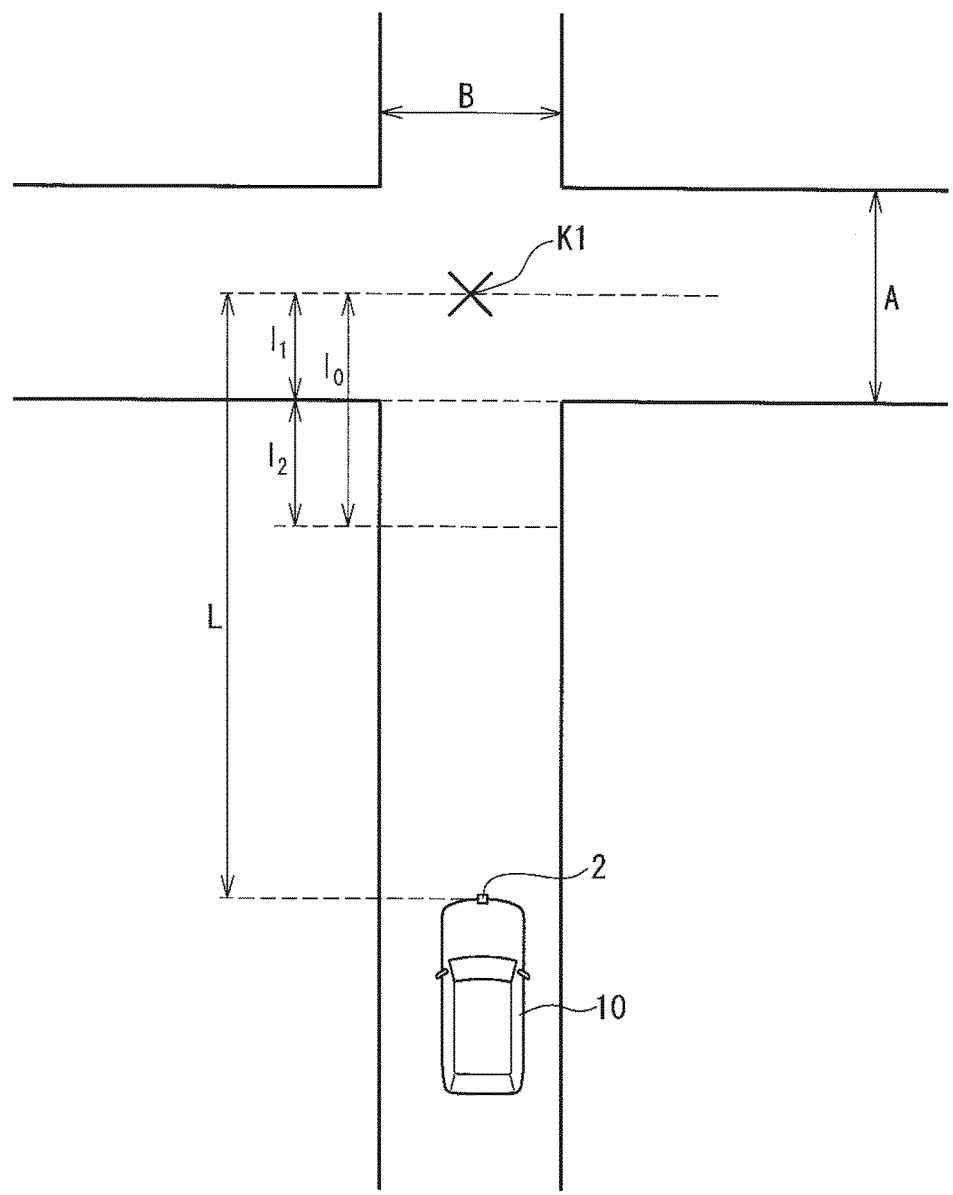
FIG. 9 is a top view illustrating an example of distances L, $l_0$, intersection position K1, etc.

FIG. 9 is a top view illustrating an example of positional relationships among the distances L, $l_0$, the intersection position K1, etc. In the example illustrated in FIG. 9, the intersection position K1 is set at the center of the intersection (the intersection point of lines (central lines) passing through the center of the intersecting roads). The vehicle 10 is traveling towards the intersection position K1. Here, the distance $l_0$ is the sum of a distance $l_1$ determined by the width of the road (road width A) into which the vehicle 10 is about to enter and a certain fixed value $l_2$. The distance $l_1$ is the distance between the intersection position and the roadside, and may be determined by $l_1=A/2$, for example. In this way, it is possible to calculate the threshold value $l_0$ used in determining the time period over which an image is captured by the camera 2 with the addition of the value based on the road width A to the fixed value performed by the composition control unit 14.

At Op9 in FIG. 8, the image input unit 7 obtains a single frame of the captured image, for example. Although an example where a single frame of the image is obtained will be described in the following, the image input unit 7 may obtain a plurality of frames at Op9 and each of the frames may be subjected to a process at Op10, which will be described later.

When the vehicle 10 is not in the vicinity of the intersection (No at Op4) or has already passed the intersection (No at Op8), the composition control unit 14 interprets Flag without obtaining the image captured by the camera 14 (Op5). When Flag is 0 ("Flag=0") (No at Op5), the process at Op 2 is performed again. When Flag is 1 ("Flag=1") (Yes at Op5), the composition control unit 14 instructs the magnifying unit 12 and the superimposition unit 13 to end the image superimposition (Op6) and sets Flag to 0 ("Flag=0") (Op7). Thereafter, the process at Op2 is performed again.

When the vehicle 10 arrives at the point apart from the intersection position by the certain distance $l_0$, due to the processes at Op4 to Op9, the image input unit 7 starts obtaining the image captured by the camera 2 and stops obtaining the image captured by the camera 2 when the vehicle 10 passes the intersection position.

When the image input unit 7 obtains a frame of the image captured by the camera 2 (original frame) at Op9, the magnifying object recognition unit 9 extracts from the original frame an area that may be recognized as a road mirror (road mirror area) (Op10). When the magnifying object recognition unit 9 extracts the road mirror area (Yes at Op11), the composition control unit 14 calculates the magnification level of the road mirror area and the position at which a magnified image is superimposed on the original frame (Op13). At Op13, the composition control unit 14 uses the distance L calculated at Op3 as well as the imaging information and the driver information stored in the recording unit 16 to calculate the magnification level and the superimposition position. In so doing, the composition control unit 14 calculates the superimposition position such that the magnified image is superimposed on the area in the original frame of the image that is directly observable to the driver H1 (non-blind spot area). Details on the process at Op13 will be described later.

Base on the magnification level calculated at Op13, the magnifying unit 12 produces a magnified image of the road mirror area extracted at Op10 (Op14). The superimposition unit 13 produces a composite image in which the magnified image is superimposed on the original frame based on the superimposition position calculated at Op13 (Op15). Then, the output unit 15 produces display data which is processed such that the composite image may be displayed on the monitor 6 (Op16) and outputs the data to the monitor 6 (Op17). As a result, the image in which the magnified image of the road mirrors is superimposed on the non-blind spot area in the image captured by the camera 2 is displayed on the monitor 6. When the composite image is displayed on the monitor 6, Flag is set to 1 ("Flag=1") (Op18).

Thereafter, Op2 is performed again. As a result of the processes illustrated in FIG. 8, the image captured by the camera 2 is displayed on the monitor 6 during the period between the arrival of the vehicle 10 at the point apart from the intersection position by the distance $l_0$ and the passage of the intersection position. At that time, when a road mirror is in an image captured by the camera 2, an image of the road mirror is magnified and displayed in the non-blind spot area in the captured image. By simply glancing at the image on the monitor 6, the driver H1 may check both the conditions of the blind spot area reflected on the road mirror and the conditions of the blind spot area captured by the camera 2.

<Exemplary Calculation of Magnification Level and Superimposition Position>

Figure 10:
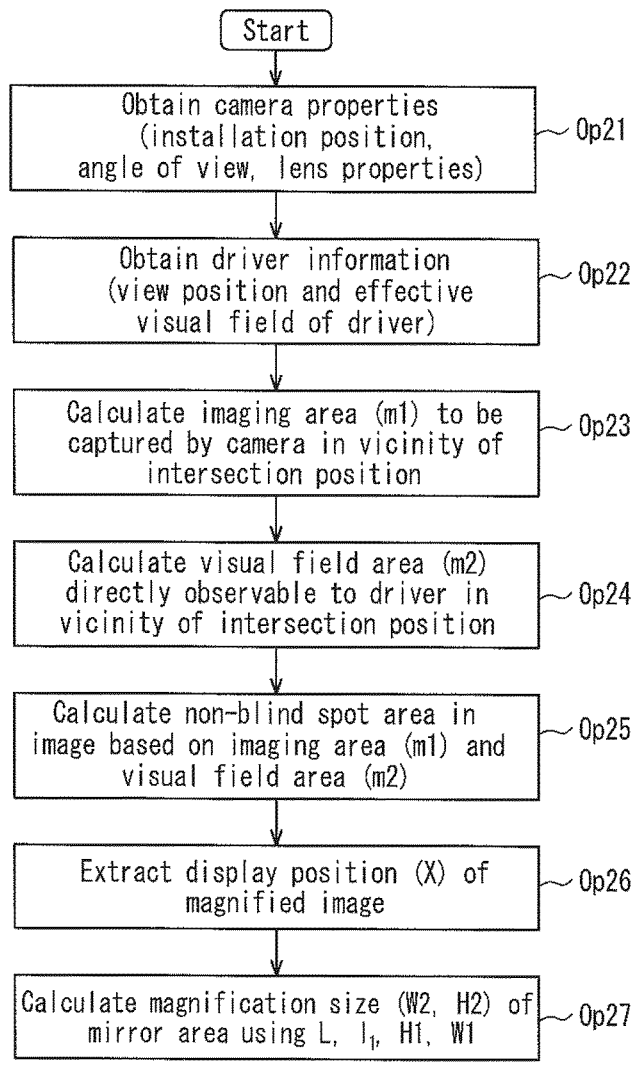
FIG. 10 is a flowchart illustrating exemplary processing performed by the composition control unit 14.

An exemplary calculation of the magnification level and the superimposition position at Op13 in FIG. 8 will be described. FIG. 10 is a flowchart illustrating an example of the process performed by the composition control unit 14 at Op13. In FIG. 10, the composition control unit 14 retrieves the camera properties of the camera 2 from the recording unit 16 as the imaging information (Op21). For example, the camera properties include the installation position, angle of view and lens properties of the camera 2.

Further, the composition control unit 14 obtains the view position and effective visual field of the driver from the recording unit 16 as the driver information (Op22). Normally, in a case of the vehicle 10, the view position of the driver may be determined based on the driver seat position. Thus, the driver seat position may be pre-stored in the recording unit 16 as the data indicating the view position of the driver.

The composition control unit 14 uses the camera properties obtained at Op21 and the distance L to calculate the imaging area captured by the camera 2 in the vicinity of the intersection position (Op22). Furthermore, the composition control unit 14 uses the driver information obtained at Op22 and the distance L to calculate the visual field area directly observable to the driver in the vicinity of the intersection position (Op23).

Hereinafter, an exemplary calculation at Op22 and Op23 will be described with reference to FIG. 11. As the imaging area and the visual field area in the vicinity of the intersection, here, a case of calculating those on a line passing through a horizontal plane including the intersection position K1 and perpendicular to the traveling direction of the vehicle will be described. Note that the imaging area and the visual field area in the vicinity of an intersection are not limited to those in this example. For example, the imaging area and the visual field area on a line passing through or a plane including a position advanced from the intersection position K1 by ½ of the road width A may be calculated.

Figure 11:
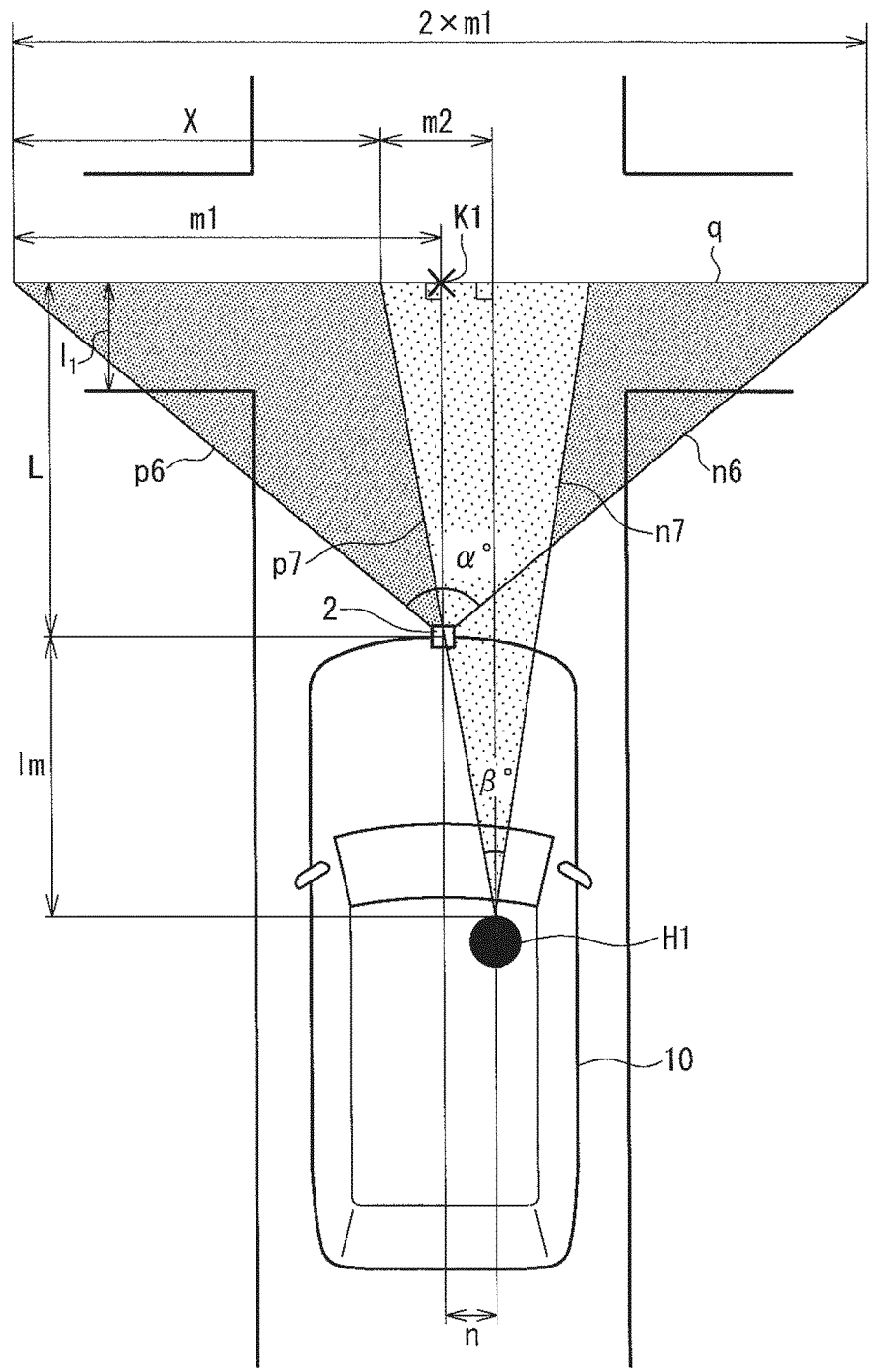
FIG. 11 is a top view illustrating exemplary imaging area and visual field area present when the vehicle is about to enter an intersection.

FIG. 11 is a top view illustrating exemplary imaging area and visual field area when the vehicle 10 is about to enter an intersection. In the example illustrated in FIG. 11, the position of the camera 2 on the vehicle 10 corresponds to the current position of the vehicle 10 and the intersection position K1 is on a line extending from the current position to the traveling direction of the vehicle 10.

In FIG. 11, a range between lines p6 and n6 is an area to be captured by the camera 2 in the horizontal direction. The angle "α" between the lines p6 and n6 is the monitorable angle of the camera 2. The value of angle of view of the camera 2 included in the camera properties may be used as the value of "α". Further, the composition control unit 14 may calculate the value of "α" based on the angle of view and lens properties of the camera 2. Alternatively, the value of "α" may be pre-stored in the recording unit 16 as a fixed value.

Further, a range between lines p7 and n7 is an area that is directly observable to the driver H1. An angle "β" between the lines p7 and n7 is the effective visual field of the driver H1. For example, the value of "β" may be pre-stored in the recording unit 16 as a fixed value. The effective human visual field is a visual field in which an object can be captured simply by eye movements and a target object may be perceived in the noise. Since the normal effective visual field of humans is about 15° in left and right eyes, this value may be stored as the value of the angle "β".

Further, $l_m$ denotes the distance between the installation position of the camera 2 and the driver H1 in the traveling direction and n denotes the distance between the installation position of the camera 2 and the driver H1 in the direction perpendicular to the traveling direction. These distances $l_m$ and n may be determined from the installation position of the camera 2 obtained at Op21 and the view position of the driver obtained at Op22. Alternatively, these distances $l_m$ and n may be pre-stored in the recording unit 16.

On a line q, line passing through a horizontal plane including the intersection position K1 and perpendicular to the traveling direction of the vehicle, the area captured by the camera 2 is from the intersection point of the lines q and p6 to the intersection point of the lines q and n6. Further, the area that is directly observable to the driver H1 is from the intersection point of the lines q and p7 to the intersection point of the lines q and n7.

At Op22, the composition control unit 14 calculates ½ of the length of the area captured by the camera 2 on the line q (=m1) as the imaging area. In this calculation, the monitorable angle α and the distance L between the vehicle 10 and the intersection position are used. Specifically, the value of m1 may be calculated as expressed by the following equations (1) and (2).

$$\tan(\alpha/2) = m1/L \qquad (1)$$

$$m1 = L \times \tan(\alpha/2) \qquad (2)$$

Further, at Op23, the composition control unit 14 calculates ½ of the length of the area directly observable to the driver H1 on the line q (=m2) as the visual field area. In this calculation, the distance L, the angle β and the distance $l_m$ between the camera 2 and the driver H1 in the traveling direction are used. Specifically, the value of m2 may be calculated as expressed by the following equations (3) and (4).

$$\tan(\beta/2) = m2/(L+l_m) \qquad (3)$$

$$m2 = (L+l_m) \times \tan(\beta/2) \qquad (4)$$

The composition control unit 14 uses m1 and m2 to calculate the positional relationship between the imaging area and the visual field area. Specifically, in the example illustrated in FIG. 11, the composition control unit 14 calculates a distance X between the intersection point of the lines q and p6 and the intersection point of the lines q and p7. The distance X is an exemplary value representing the positional relationship between the imaging area and the visual field area, and it is from the left end of the imaging area to the left end of the visual field area. The value of X may be calculated by the following equation (5) when $l_0 \le L$, equation (6) when $l_1 < L \le l_0$ and equation (7) when $0 < L \le l_1$. In this way, by changing the ways to calculate the value of X in accordance with the value of the distance L between the vehicle 10 and the intersection position K1, it is possible to calculate the superimposition position appropriately in accordance with the distance L.

When $l_0 \le L$:

$$X = 0 \qquad (5)$$

When $l_1 < L \le l_0$:

$$X = m1 - (m2 - n) \qquad (6)$$
$$= \{L \times \tan(\alpha/2)\} - \{(L+l_m) \times \tan(\beta/2) - n\}$$

When $0 < L \le l_1$:

$$X = \{l_1 \times \tan(\alpha/2)\} - \{(l_1+l_m) \times \tan(\beta/2) - n\} \qquad (7)$$

With the use of m1, m2 and X calculated in this way, the composition control unit 14 calculates a value representing the non-blind spot area in the image captured by the camera 2 (Op25 in FIG. 10). For example, the composition control unit 14 calculates the left end position of a portion in the captured image where the visual field of the driver H1 is shown (non-blind spot area).

Specifically, the composition control unit 14 uses the value representing the imaging area (m1), the value representing the visual field area (m2) and the distance X between the left end of the imaging area and the left end of the visual field area to calculate the left end position of the non-blind spot area in the image captured by the camera 2. An example of this calculation will be described with reference to FIG. 12.

Figure 12:
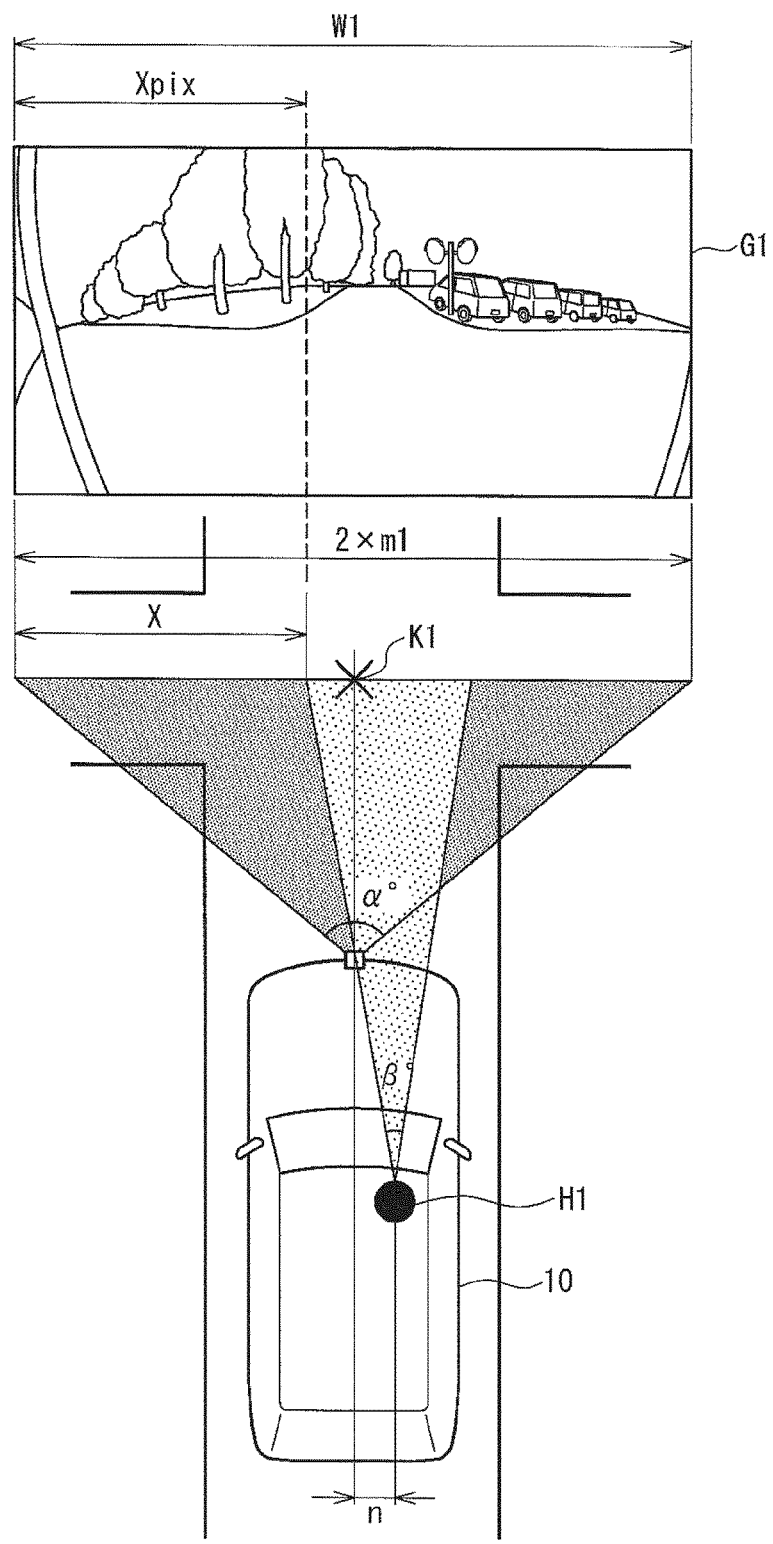
FIG. 12 is a diagram illustrating an image captured by the camera in the example of FIG. 11 made to fit an image display area of a monitor.

FIG. 12 is a diagram illustrating an image captured by the camera 2 in the example of FIG. 11, which is fit into the display area of the monitor. In the example illustrated in FIG. 12, the width of the imaging area on the line q (2×m1) corresponds to a width W1 of a captured image G1. Here, it is assumed that the width W1 of the captured image G1 is the width of the image display area of the monitor 6. For example, the width W1 is pre-stored in the recording unit 16 as a fixed value.

As illustrated in FIG. 12, it is possible to assume that the positional relationship between the imaging area and the visual field area on the line q corresponds to the positional relationship between the overall captured image G1 and the non-blind spot area in the image. In other words, it is possible to assume that the relationship between the width W1 of the captured image G1 and a length $X_{PIX}$ between the left end of the captured image G1 and the left end of the non-blind spot area corresponds to the relationship between the width of the imaging area (2×m1) and the distance X. If that is the case, the following equation (8) holds true.

$$(2 \times m1):W1 = X:X_{PIX} \tag{8}$$

$X_{PIX}$ may be calculated by the following equation (9).

$$X_{PIX} = (X \times W1)/(2 \times m1) \tag{9}$$

The composition control unit 14 calculates the value of $X_{PIX}$ as the value representing the non-blind spot area (Op25 in FIG. 10) and further notifies the superimposition unit 13 of $X_{PIX}$ as the value directly representing the superimposition position (Op26). Note that the value representing the superimposition position is not limited to $X_{PIX}$. For example, the composition control unit 14 may determine the left end and right end positions of the visual field area on the line q and set the position in the captured image corresponding to the midpoint of the two ends as the superimposition position.

The method for calculating the non-blind spot area described above is based upon the premise that the monitorable angle α of the camera 2 is smaller than 180°. When the angle of view of the camera 2 is 180° or more, for example, by subtracting 1° each from 180° on the left and right to set a to 178°, the non-blind spot area may be calculated using the above-described calculation method.

The area captured by the camera 2 becomes larger as the value of α increases. This results in a decrease in the proportion of the image of a road mirror portion to the captured image, making the road mirror portion difficult to see. For this reason, by pre-storing in the recording unit 16 the maximum monitorable angle $\alpha_{max}$ (=threshold value) of the camera 2 at which road mirrors are recognized, it is possible to set an image of the area within the maximum monitorable angle $\alpha_{max}$ as the captured image even when the angle of view of the camera 2 is larger than the maximum monitorable angle $\alpha_{max}$. As a result, even when the angle of view of the camera 2 is 180° or more, the non-blind spot area may be calculated using the calculation method described above.

Next, at Op27, the composition control unit 14 calculates the magnification size of the magnified image (the size after magnification). Here, as illustrated in FIGS. 7A and 7B, it is assumed that W1 and H1 denote the width and height of the image display area of the monitor 6, in other words, the width and height of the captured image, respectively, and W2 and H2 denote the width and height of the magnified image, respectively. The values of W1 and H1 are pre-stored in the recording unit 16, for example. The values of W2 and H2 may be calculated respectively by the following equations (10) and (11) when $l_0 < L$, equations (12) and (13) when $l_1 < L \le l_0$ and equations (14) and (15) when $0 < L \le l_0$. In this way, by changing the ways to calculate the magnification size (W2, H2) in accordance with the value of the distance L between the vehicle 10 and the intersection position K1, it is possible to calculate the magnification size appropriately in accordance with the distance L.

When $l_0 < L$:

$$W2 = 0 \tag{10}$$

$$H2 = 0 \tag{11}$$

When $l_1 < L \le l_0$:

$$W2 = W1 - (a \times L) \tag{12}$$

$$H2 = H1 - (b \times L) \tag{13}$$

When $0 < L \le l_1$:

$$W2 = W1 - (a \times l_1) \tag{14}$$

$$H2 = H1 - (b \times l_1) \tag{15}$$

In the equations (12) to (15), coefficients a, b are constants and the values of the coefficients a, b are appropriately determined based on the camera properties and the road width B, for example. Specifically, the coefficient a may be determined with the use of a table in which value combinations of the horizontal angle of view of the camera 2 (horizontal angle of view VX) and the road width B and values of the coefficient a corresponding to the combinations are pre-stored. Table 1 below is an example of the table in which the values of the coefficient a corresponding to the value combinations of the horizontal angle of view VX and the road width B are stored.

TABLE 1

| Horizontal angle of view VX | Road width B | | | |
|---|---|---|---|---|
| | $B < B_1$ | $B_1 \le B < B_2$ | ... $B_{m-1} \le B < B_m$ | $B_m \le B$ |
| $VX < VX_1$ | $a_{1-1}$ | $a_{1-2}$ | ... $a_{1-(m-1)}$ | $a_{1-m}$ |
| $VX_1 \le VX < VX_2$ | $a_{2-1}$ | $a_{2-2}$ | ... $a_{2-(m-1)}$ | $a_{2-m}$ |
| ... | ... | ... | ... ... | ... |
| $VX_{n-1} \le VX < VX_n(180°)$ | $a_{(n-1)-1}$ | $a_{(n-1)-2}$ | ... $a_{(n-1)-(m-1)}$ | $a_{(n-1)-m}$ |
| $VX_n(180°) \le VX$ | $a_{n-1}$ | $a_{n-2}$ | ... $a_{n-(m-1)}$ | $a_{n-m}$ |

Similarly, the coefficient b may be determined with the use of a table in which value combinations of the vertical angle of view of the camera 2 (vertical angle of view VZ) and the road width B and the values of the coefficient b corresponding to the combinations are pre-stored. Table 2 below is an example of the table in which the values of the coefficient b corresponding to the value combinations of the vertical angle of view VZ and the road width B are stored.

TABLE 2

| Vertical angle of view VZ | Road width B | | | |
|---|---|---|---|---|
| | $B < B_1$ | $B_1 \leq B < B_2$ | ... $B_{m-1} \leq B < B_m$ | $B_m \leq B$ |
| $VZ < VZ_1$ | $b_{1-1}$ | $b_{1-2}$ | ... $b_{1-(m-1)}$ | $b_{1-m}$ |
| $VZ_1 \leq VZ < VZ_2$ | $b_{2-1}$ | $b_{2-2}$ | ... $b_{2-(m-1)}$ | $b_{2-m}$ |
| ... | ... | ... | ... ... | ... |
| $VZ_{n-1} \leq VZ < VZ_n(180°)$ | $b_{(n-1)-1}$ | $b_{(n-1)-2}$ | ... $b_{(n-1)-(m-1)}$ | $b_{(n-1)-m}$ |
| $VZ_n(180°) \leq VZ$ | $b_{n-1}$ | $b_{n-2}$ | ... $b_{n-(m-1)}$ | $b_{n-m}$ |

Note that the ways to determine the coefficients a, b are not limited to those in the example described above. For example, in addition to the road width, horizontal angle of view and vertical angle of view, the height and width of an image sent out from the camera may be added to the conditions for determining the coefficients a, b. Further, it is not necessary to include the road width B in the conditions. Further, the magnification size may be determined by using the value representing the non-blind spot area calculated at Op25. For example, the size of the magnified image may be set to fit into the non-blind spot area.

In this way, the magnifying unit 12 is notified of the magnification size (W2, H2) calculated at Op27. The magnifying unit 12 magnifies the road mirror area in the original frames of the captured image such that the road mirror area is magnified to have the magnification size (W2, H2).

As described above with reference to FIGS. 10 to 12, the composition control unit 14 uses the imaging information on the camera 2 and the distance L to calculate the imaging area, and uses the driver information and the distance L to calculate the visual field area. Then, the composition control unit 14 uses the value representing the relationship between the installation position of the camera 2 and the position of the driver H1 to determine the positional relationship between the imaging area and the visual field area. With the use of this positional relationship, the composition control unit 14 may calculate the value representing the non-blind spot area.

<Exemplary Display Image>

Figure 13:
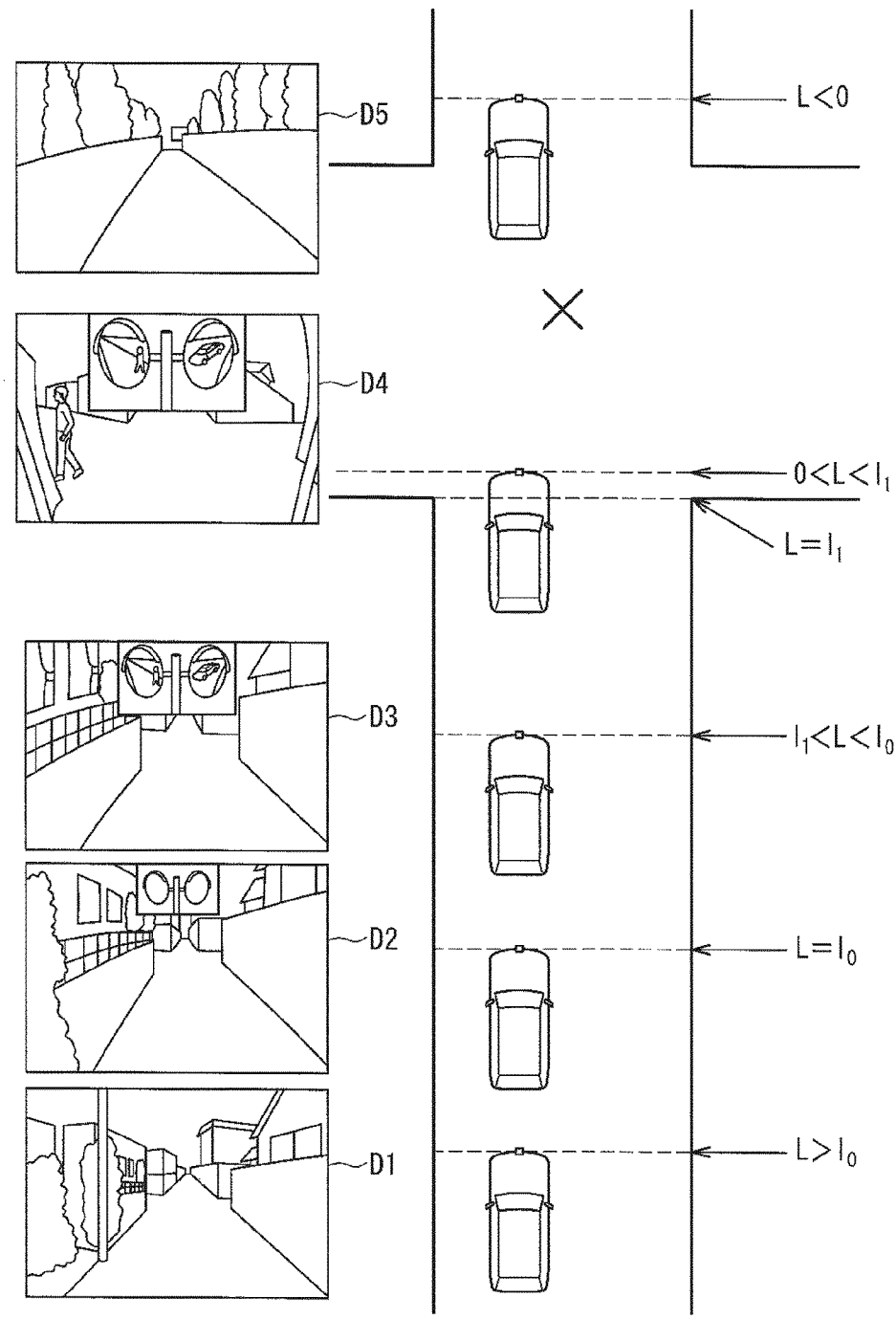
FIG. 13 is a diagram illustrating an example when a composite image including a magnified image with a magnified size is displayed.

FIG. 13 is a diagram illustrating an example where a composite image including the magnified image having the magnification size is displayed on the monitor 6. The example in FIG. 13 illustrates exemplary screens each displayed on the monitor 6 when the vehicle 10 passes each position in the course of entry into and passage of an intersection.

When the vehicle 10 has not arrived within a range apart from the intersection position K1 by the threshold value $l_0$ (when $l_0 < L$), a screen D1 is displayed on the monitor 6. When the vehicle 10 enters within the range apart from the intersection position K1 by $l_0$, a screen D2 is displayed. In the screen D2, the road mirror portion is magnified and is superimposed on the original captured image. Thereafter, until the vehicle 10 enters the intersecting road (period over which $l_1 < L \leq l_0$ holds), the magnified image of the road mirrors becomes larger in size as the vehicle 10 moves closer to the intersection (screen D3). That is, the magnified image with the width W2 and height H2 calculated by the equations (12) and (13) is displayed. Then, during the period between the entry of the vehicle 10 into the intersecting road and arrival at the intersection position K1 (period over which $0 < L \leq l_1$ holds), the magnified image is displayed in fixed size (W2, H2 of the equations (14), (15)) (screen D4). And when the vehicle 10 passes the intersection position K1 (0>L), the magnified image is not shown as in the screen D5.

As described above, because of the screen transitions illustrated in FIG. 13, the magnified image of road mirrors is superimposed on the original captured image and is displayed in the size and at the position that allow the driver H1 to check the image easily in accordance with the conditions of the vehicle 10. In particular, road conditions on the left and right sides that are not directly observable to the driver H1 are displayed in a single screen immediately after the entry of the vehicle into the intersection (immediately after $L = l_1$ holds). Thus, by simply glancing at the monitor 6, the driver H1 may check the situation in the blind spots reflected on the road mirrors and the situation in the blind spots captured by the camera 2.

Note that the screen transitions described above are one example and are not limited to one described above. For example, when L<0 and $l_0 < L$ hold, an image captured by the camera 2 may not be displayed.

As described above, the driver H1 may check the situation in blind spot areas captured by both the camera 2 and road mirrors through a single action (action of checking the situation in the blind spot areas on the monitor 6). As a result, the burden on the driver H1 is reduced and the situation that changes momentarily may be recognized with certainty.

Further, according to the image processor 3, by detecting the road mirror area from the image captured by the camera 2, magnifying the area and superimposing the magnified area on the non-blind spot area in the original captured image, it is possible to display the composite image in a single screen. Consequently, conditions of a bicycle, pedestrian or vehicle present in an area that cannot be captured by the camera 2 or road mirrors alone may be presented to the driver H1. As a result, the number of collision accidents upon entry into intersections, accidents making up the majority of traffic accidents, may be expected to decline.

<Modified Example of Calculation of Superimposition Position>

Figure 14:
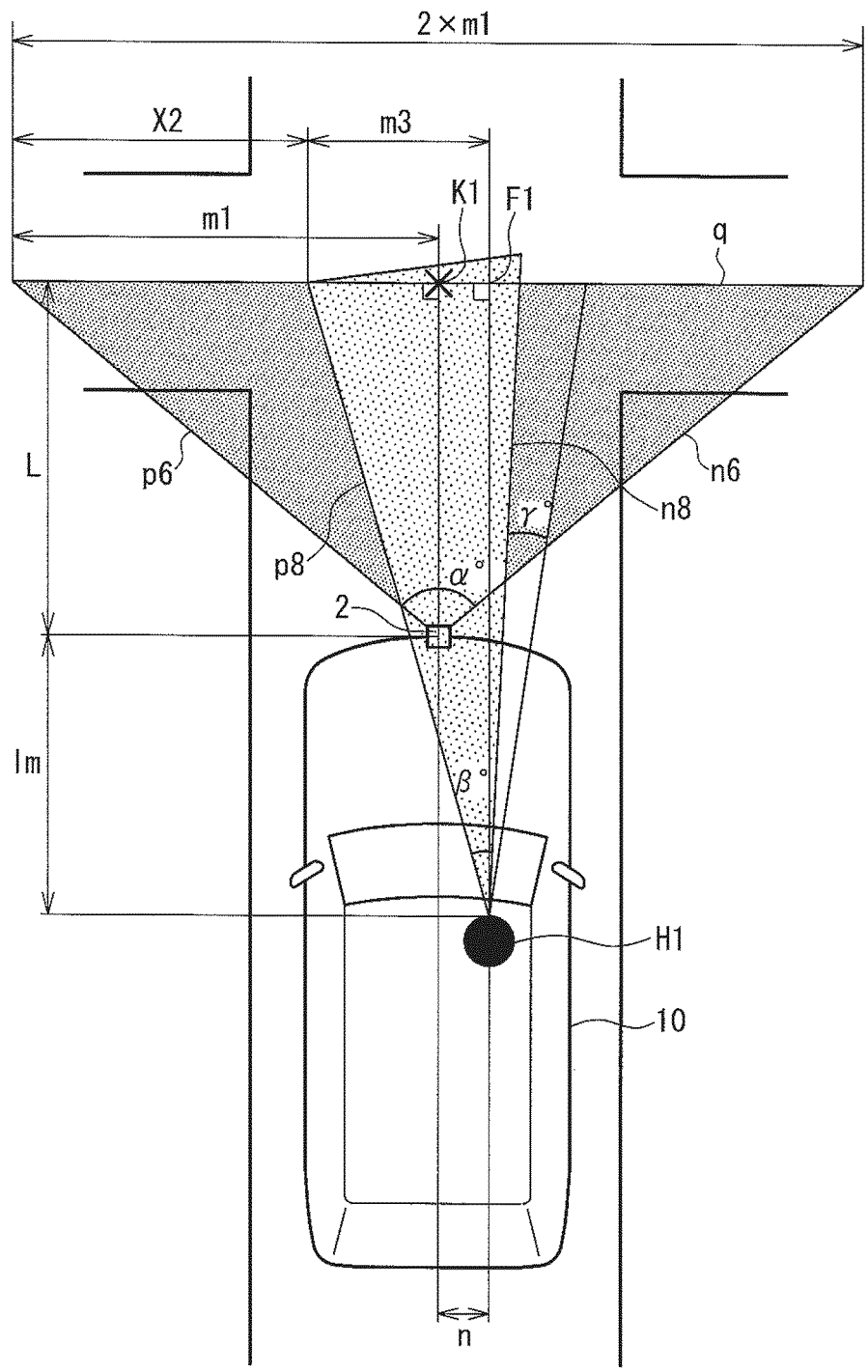
FIG. 14 is a top view illustrating exemplary imaging area and visual field area when the vehicle is about to enter an intersection.

Here, a description will be given of a modified example of calculation of the imaging area (m1), the visual field area (m2) and the value (X) representing the positional relationship between the two areas, which have been described with reference to FIG. 11. In the example illustrated in FIG. 11, the optical axis of the camera 2 and the viewing direction of the driver H1 (direction of eyes) are substantially parallel with each other and they are also parallel with the traveling direction of the vehicle 10. In contrast, in this modified example, the optical axis of the camera 2 and the viewing direction of the driver H1 are not parallel with each other. FIG. 14 is a top view illustrating exemplary imaging area and visual field area in this modified example when the vehicle 10 is about to enter an intersection. Variables L, m1, lm, n, α and β illustrated in FIG. 14 are the same as the variables illustrated in FIG. 11. In the example illustrated in FIG. 14, the direction of the driver H1's eyes is shifted from the traveling direction by an angle γ on the horizontal plane. Here, a range between lines p8 and n8 is an area that is directly observable to the driver H1. The value of the angle γ may be pre-stored in the recording unit 16 or may be set by the driver H1 through the navigation system 5, for example. Further, information regarding the angle γ may be obtained from a vehicle-mounted device (not shown) for monitoring the driver H1's eye movements through the vehicle information input unit 8.

Similarly to the example illustrated in FIG. 11, in the example illustrated in FIG. 14, ½ of the length of the area captured by the camera 2 on the line q (=m1) may be calculated by the equation 2.

$$m1 = L \times \tan(\alpha/2) \qquad (2)$$

In this modified example, it is assumed that the distance between an intersection point F1 of the line q and a line extending from the driver H1 in the traveling direction and the point of left end of the area directly observable to the driver H1 (intersection point of the lines p8 and q) is m3. The composition control unit 14 calculates the value of m3 as the value of the visual field area of the driver H1. Since the angle between a line connecting the point F1 and the driver H1 and the line p8 is $(\gamma+\beta/2)$, the following equation (16) holds true. Consequently, m3 may be calculated by the following equation (17).

$$\tan(\gamma+\beta/2)=m3/(L+l_m) \quad (16)$$

$$m3=(L+l_m)\times\tan(\gamma+\beta/2) \quad (17)$$

The composition control unit 14 uses m1 and m3 to calculate the positional relationship between the imaging area and the visual field area. Specifically, the composition control unit 14 calculates a distance X2 between the intersection point of the lines q and p6 and the intersection point of the lines q and p8. This is the distance between the left end of the imaging area and the left end of the visual field area. The value of X2 may be calculated by the following equations (18) to (20).

When $l_0 < L$:

$$X2=0 \quad (18)$$

When $l_1 < L \leq l_0$:

$$X2 = m1 - (m3 - n) \quad (19)$$
$$= \{L\times\tan(\alpha/2)\} - \{(L+l_m)\times\tan(y+\beta/2) - n\}$$

When $0 < L \leq l_1$:

$$X2=\{l_1\times\tan(\alpha/2)\}-\{(l_1+l_m)\times\tan(\gamma+\beta/2)-n\} \quad (20)$$

With the use of m1, m3 and X2 calculated in this way, the composition control unit 14 calculates the value representing the non-blind spot area in the image captured by the camera 2. For example, when it is assumed that the relationship between the width W1 of the captured image and a length $X_{PIX\text{-}2}$ between the left end of the captured image and the left end of the non-blind spot area corresponds to the relationship between the width (2×m1) of the imaging area and the distance X2, the following equation (21) holds true. Consequently, $X_{PIX\text{-}2}$ may be calculated by the following equation (22).

$$(2\times m1):W1=X2:X_{PIX\text{-}2} \quad (21)$$

$$X_{PIX\text{-}2}=(X2\times W1)/(2\times m1) \quad (22)$$

The composition control unit 14 may calculate the value of $X_{PIX\text{-}2}$ as the value representing the non-blind spot area and notify the superimposition unit 13 of the value of $X_{PIX\text{-}2}$ as the value representing the superimposition position. As a result, the output unit 15 may produce a composite image in which the magnified image is superimposed on the non-blind spot area in the captured image and output the composite image to the monitor 6.

In this modified example, the case where the eye direction of the driver H1 is shifted from the traveling direction towards the left side has been described. By using the calculation method in this modified example, it is possible to calculate the non-blind spot area even when the optical axis of the camera 2 is rotated by a certain angle (horizontal rudder angle) on the horizontal plane.

Figure 15A:
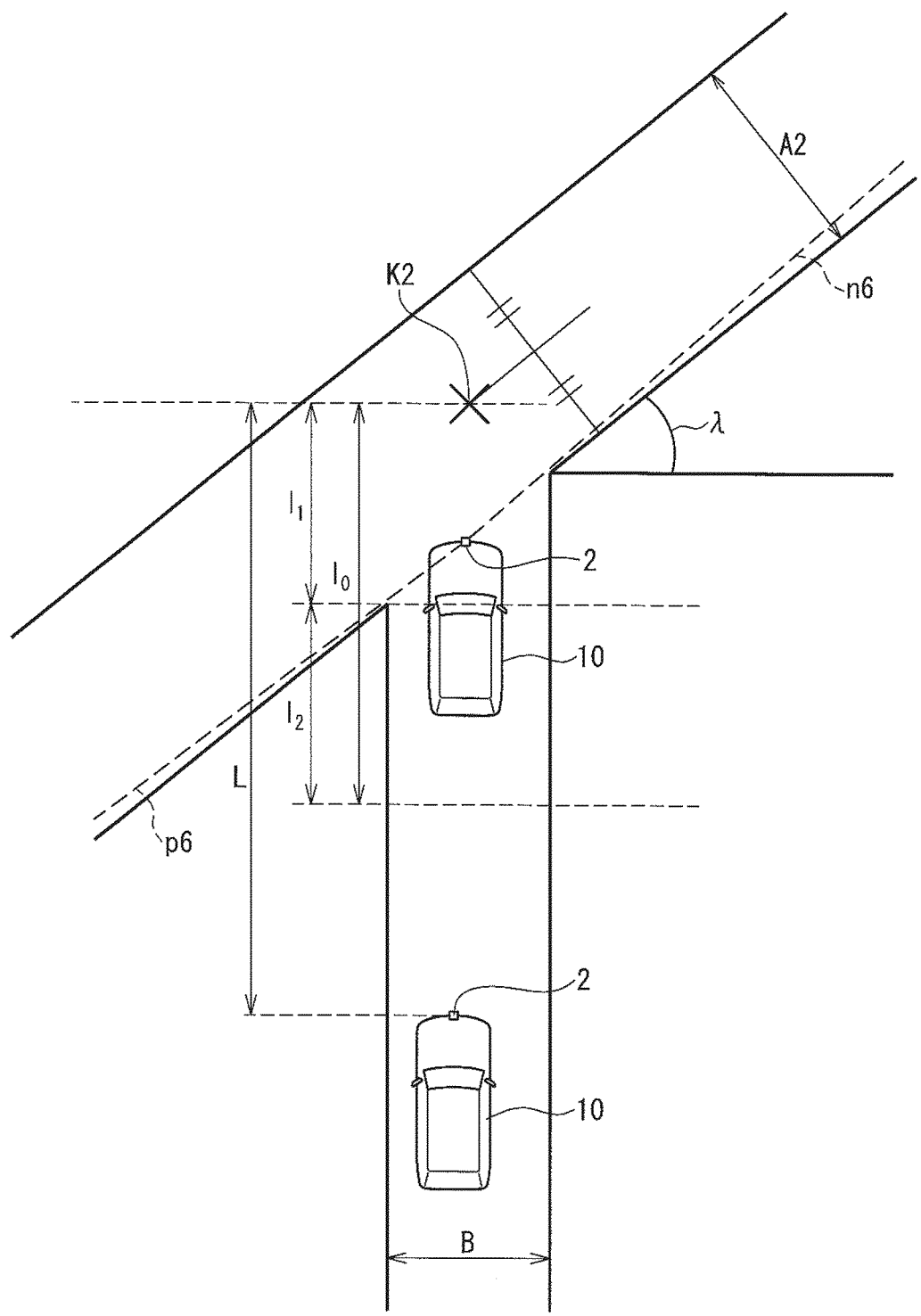
FIG. 15A is a top view illustrating a situation in which the vehicle enters a road at an angle other than 90°.
Figure 15B:
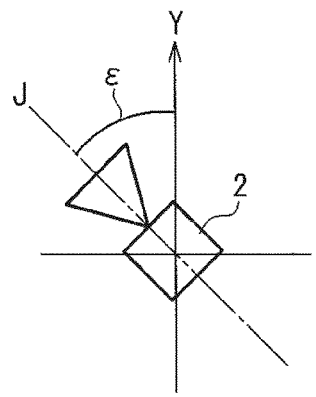
FIG. 15B is a magnified view of the vehicle-mounted camera 2 portion.

FIGS. 15A and 15B illustrate an example where the optical axis of the camera 2 is rotated by a certain rudder angle. FIG. 15A is a top view illustrating an example where the vehicle 10 is about to enter a road at an angle other than 90°. At the junction (T junction) illustrated in FIG. 15A, two roads merge at an angle λ. Here, as an example, it is assumed that the intersection point of center lines of these two merging roads is a junction point K2. B denotes the width of the road on which the vehicle 10 is traveling and A2 denotes the width of the road to which the vehicle is about to enter. L denotes the distance between the vehicle 10 and the junction position K2, $l_1$ denotes the distance between the junction position K2 and the roadside, 12 denotes a threshold value for determining the staring point to display the magnified image and $l_0$ denotes the distance between the junction position K2 and the starting point to display the magnified image. The distance $l_1$ is calculated by $l_1=(A2/2)\cos\lambda+(B/2)\tan\lambda$, for example. The road information such as the widths A2 and B, the angle λ at which the two roads merge and the junction position K2 may be obtained from the navigation system 5 through the vehicle information input unit 8.

FIG. 15B is a magnified view illustrating the camera 2 portion of the vehicle 10. In FIG. 15B, the Y axis indicates the traveling direction of the vehicle 10 and a line J indicates the direction of optical axis of the camera 2 on the horizontal plane. On the horizontal plane, the optical axis J of the camera 2 is rotated from the Y axis in an anti-clockwise direction by an angle ε. In other words, it could be said that the horizontal rudder angle of the camera 2 is ε.

Here, the rudder angle of the camera 2 may be controlled by other ECU mounted on the vehicle (e.g., a camera controlling ECU (not shown)). As an example, this ECU may control the horizontal rudder angle ε of the camera 2 in accordance with the angle λ between the road on which the vehicle 10 is traveling and the road into which the vehicle 10 is about to enter. For example, the horizontal rudder angle ε of the camera 2 is controlled such that the optical axis becomes perpendicular to the road into which the vehicle is about to enter.

For example, the image input unit 7 may obtain the information indicating the horizontal rudder angle ε of the camera 2 from the ECU as one of the camera properties. By receiving the horizontal rudder angle ε of the camera 2 from the image input unit 7, the composition control unit 14 may use the angle to calculate the non-blind spot area.

The composition control unit 14 calculates the non-blind spot area by calculating the imaging area when the camera 2 is rotated by the rudder angle ε and determining the positional relationship between the calculated imaging area and the visual field area. Similarly to the calculation method used in calculating the visual field area when the direction of the driver H1's eyes is rotated by the angle γ described above, the composition control unit 14 may calculate the imaging area when the camera 2 is rotated by the horizontal rudder angle ε. Further, with the use of the equations (10) to (15), the composition control unit 14 may calculate the size (W2, H2) of the magnified image appropriately in accordance with the distance L.

As described above, even when the optical axis of the camera 2 is rotated by the certain horizontal rudder angle on the horizontal plane, by calculating the non-blind spot area, it is possible to determine the superimposition position and the magnification size of the magnified image.

<Calculation of Superimposition Position and Magnification Level when Vehicle 10 is Heading for Curve>

Figure 16:
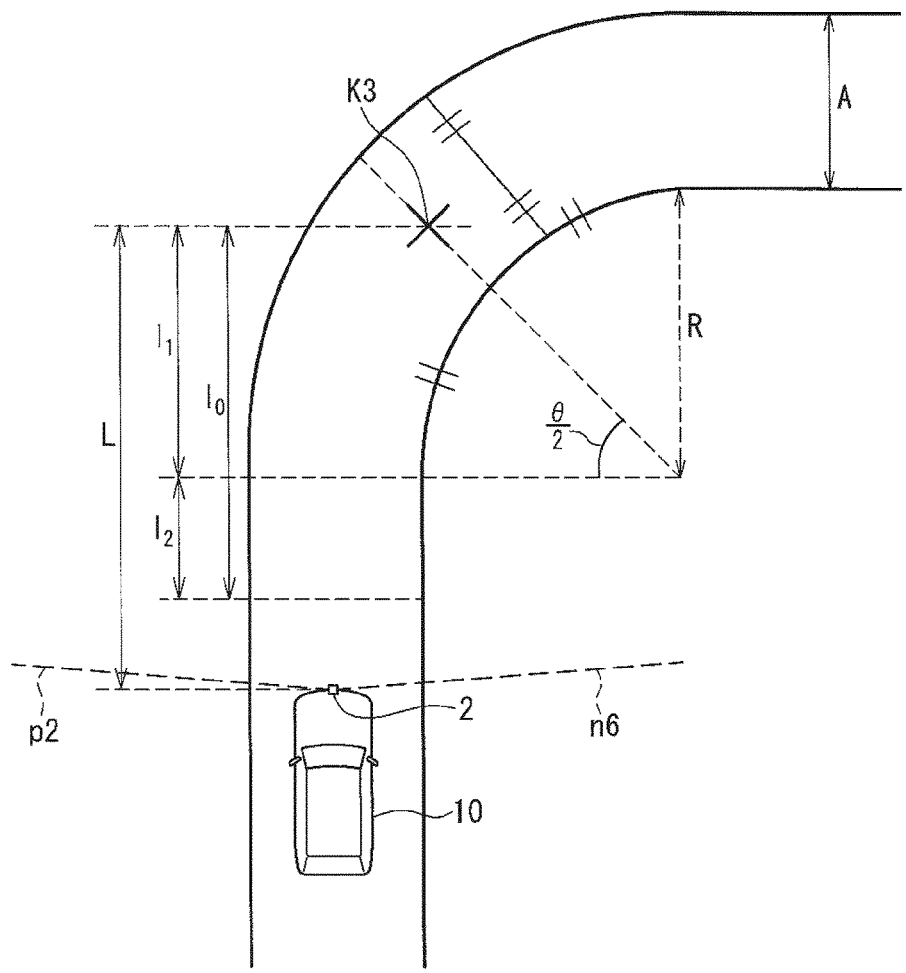
FIG. 16 is a top view illustrating a situation in which the vehicle heads for a curve.

Another modified example of the operation of the composition control unit 14 will be described. Here, a description will be given of an exemplary calculation performed by the composition control unit 14 when the vehicle 10 is heading for a curve. FIG. 16 is a top view illustrating an exemplary situation in which the vehicle 10 is heading for a curve.

FIG. 16 illustrates a situation in which the vehicle 10 is about to approach a curve with a radius of curvature R. As an example, it is assumed that a curve position K3 is an intersection point of the center line of the road and a line bisecting the rotating angle (θ) of the curve. A denotes the width of the road on which the vehicle 10 is traveling, L denotes the distance between the vehicle 10 and the curve position K3, $l_1$ ($l_1$=(R+A/2)sin(θ/2)) denotes the distance between the curve position K3 and the starting point of the curve, $l_2$ denotes a threshold value (fixed value) for determining the starting point to display the magnified image, and $l_0$ denotes the distance between the curve position K3 and the starting point to display the magnified image. The road information such as the road width A, the rotating angle θ of the curve, the curve position K3 and the radius of curvature R of the curve may be obtained from the navigation system 5 through the vehicle information input unit 8.

Similarly to the calculation of the non-blind spot area described with reference to FIGS. 11 and 12, the composition control unit 14 may calculate the non-blind spot area in the captured image by determining the positional relationship between the imaging area and the visual field area. Further, with the use of the following equations (23) to (28), the composition control unit 14 may calculate the size (W2, H2) of the magnified image appropriately in accordance with the distance L.

When $l_0 < L$:

$$W2 = 0 \tag{23}$$

$$H2 = 0 \tag{24}$$

When $l_1 < L \leq l_0$:

$$W2 = W1 - (a \times L) + (e \times L) \tag{25}$$

$$H2 = H1 - (b \times L) + (f \times L) \tag{26}$$

When $0 < L \leq l_1$:

$$W2 = W1 - (a \times l_1) + (e \times l_1) \tag{27}$$

$$H2 = H1 - (b \times l_1) + (f \times l_1) \tag{28}$$

Similarly to the coefficients a, b in the equations (12) to (15), the coefficients a, b in the equations (25) to (28) may be determined based on the camera properties and the road width A. The coefficients e, f are determined based on R of the curve. For example, for the coefficients e, f, values that become larger as R becomes smaller are predefined and stored in the recording unit 16. Specifically, the values of the coefficients e, f may be determined with the use of a function that defines the values of the coefficients e, f that change in accordance with R or a table in which the values of the coefficients e, f respectively corresponding to the values of R are stored.

In this way, even when the vehicle 10 approaches and passes a curve, the superimposition position and the magnification size of the magnified image of road mirrors may be determined by calculating the non-blind spot area. Further, since the size of the magnified image is adjusted in accordance with the curvature of curves, it is possible to display a road mirror in large size at curves with a large curvature, that is, at steep curves.

<Calculation for determining Magnification Level of Magnified Image According to Frequency of Accidents>

In addition to the road information and the vehicle position information, the composition control unit 14 may take a variety of factors into consideration when determining the magnification size of the magnified image. For example, the composition control unit 14 may determine the magnification size in accordance with the frequency of occurrence of accidents at the intersection into which the vehicle 10 is about to enter. Here, as illustrated in FIG. 9, an exemplary calculation when the vehicle 10 is about to enter an intersection will be described. For example, the composition control unit 14 may obtain a value representing the frequency of occurrence of accidents at the intersection into which the vehicle 10 is about to enter from the navigation system 5 through the vehicle information input unit 8.

For example, the value representing the frequency of occurrence of accidents is the number of accidents occurred in the vicinity of the intersection in the past 10 years. Alternatively, the value may represent the frequency of season-by-season or period-by-period occurrence of accidents. Upon these values, the fact that the number of accidents is small during the summer but the incidence of accidents increases during the winter due to the road being covered with snow or the number of accidents is small during the daytime but the number increases during the night time and early morning hours is reflected.

For example, with the use of the following equations (29) to (34), the composition control unit 14 may calculate the size (W2, H2) of the magnified image appropriately in accordance with the distance L.

When $l_0 < L$:

$$W2 = 0 \tag{29}$$

$$H2 = 0 \tag{30}$$

When $l_1 < L \leq l_0$:

$$W2 = W1 - (a \times L) + (c \times L) \tag{31}$$

$$H2 = H1 - (b \times L) + (d \times L) \tag{32}$$

When $0 < L \leq l_1$:

$$W2 = W1 - (a \times l_1) + (c \times l_1) \tag{33}$$

$$H2 = H1 - (b \times l_1) + (d \times l_1) \tag{34}$$

Similarly to the coefficients a, b in the equations (12) to (15), the coefficients a, b in the equations (29) to (34) may be determined based on the camera properties and the road width A. Further, the coefficients c, d are determined based on the frequency of occurrence of accidents at the intersection into which the vehicle 10 is about to enter. For example, for the coefficients c, d, values that become larger as the frequency of occurrence of accidents increases are predefined and stored in the recording unit 16. Specifically, the values of the coefficients c, d may be determined with the use of a function that defines the values of the coefficients c, d that change in accordance with the frequency of occurrence of accidents or a table in which the values of the coefficients c, d respectively corresponding to the values of the frequency of occurrence of accidents are stored.

In this way, the magnification size of the magnified image of a road mirror may be determined in accordance with the frequency of occurrence of accidents at the intersection into which the vehicle 10 is about to enter. As a result, at an intersection with a high frequency of occurrence of accidents, the magnified image of a road mirror is increased in size, so that an image easily recognizable by the driver H1 may be displayed on the monitor 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An image processor comprising:
an image input unit that obtains an image captured by an imaging device installed on a vehicle;
a vehicle information input unit that obtains a distance between the vehicle and a road junction or curve in a traveling direction of the vehicle based on information received from a vehicle-mounted device installed in the vehicle;
a recording unit in which imaging information indicating properties of the imaging device and driver information regarding a visual field of a driver of the vehicle are stored;
a magnifying object recognition unit that recognizes a certain magnifying object in the captured image; and
a composing unit that produces, when the magnifying object recognition unit recognizes the certain magnifying object, a composite image of a magnified image off of the magnifying object and the captured image,
wherein the composing unit uses the distance obtained by the vehicle information input unit as well as the imaging information and the driver information stored in the recording unit to determine a non-blind spot area in the captured image that does not include an image of a blind spot for the driver, and produces the composite image such that the magnified image is superimposed on the non-blind spot area.

2. The image processor according to claim 1, wherein the composing unit uses the distance between the vehicle and the junction or the curve and the imaging information to calculate an imaging area to be captured by the imaging device in a vicinity of a position of the junction or the curve,
uses the distance between the vehicle and the junction or the curve and the driver information to calculate a visual field area to be in the visual field of the driver in the vicinity of the position of the junction or the curve, and
uses a positional relationship between the imaging area and the visual field to determine a position of the non-blind spot area in the captured image.

3. The image processor according to claim 1, wherein the composing unit uses the distance obtained by the vehicle information input unit to determine a magnification level of the magnified image.

4. The image processor according to claim 2, wherein the image input unit further obtains a horizontal rudder angle of the imaging device at a time of capturing the captured image, and
the composing unit uses the horizontal rudder angle to calculate the imaging area.

5. The image processor according to claim 1, wherein the vehicle information input unit further obtains a value representing a curvature of the curve in the traveling direction of the vehicle, and
the composing unit uses the curvature to determine a magnification level of the magnified image.

6. The image processor according to claim 1, wherein the vehicle information input unit further obtains information indicating a frequency of occurrence of accidents at the junction or the curve, and
the composing unit uses the frequency of occurrence of accidents to determine a magnification level of the magnified image.

7. The image processor according to claim 1, wherein the image processor works in conjunction with a navigation system installed in the vehicle, and
the vehicle information input unit obtains the distance between the vehicle and the road junction or the curve in the traveling direction of the vehicle from the navigation system installed in the vehicle.

8. The image processor according to claim 7, wherein the vehicle information input unit further obtains information indicating presence or absence of the magnifying object at the junction or the curve from the navigation system, and
the magnifying object recognition unit recognizes the certain magnifying object in the captured image when the certain magnifying object is present at the junction or the curve.

9. The image processor according to claim 1, wherein the magnifying object recognition unit recognizes a certain magnifying object in the captured image when the distance becomes equal to or less than a certain distance.

10. A non-transitory recording medium storing an image processing program causing a computer to perform processing of:
obtaining an image captured by an imaging device installed on a vehicle;
obtaining a distance between the vehicle and a road junction or curve in a traveling direction of the vehicle based on information received from a vehicle-mounted device installed in the vehicle;
obtaining imaging information indicating properties of the imaging device and driver information regarding a visual field of a driver of the vehicle stored in a recording unit accessible to the computer;
recognizing a certain magnifying object in the captured image; and
producing, when the certain magnifying object is recognized in the magnifying object recognition, a composite image of a magnified image off of the magnifying object and the captured image,
wherein in the production of the composite image, the obtained distance as well as the obtained imaging information and driver information are used to determine a non-blind spot area in the captured image that does not include an image of a blind spot for the driver, and the composite image is produced such that the magnified image is superimposed on the non-blind spot area.

11. A vehicle-mounted terminal working in conjunction with an imaging device installed on a vehicle, the vehicle-mounted terminal comprising:
a navigation system having a function of identifying a position of the vehicle and including a map data recording unit in which road information including a position of each road junction or curve is stored;
an image input unit that obtains an image captured by the imaging device;
a vehicle information input unit that obtains a distance between the vehicle and a road junction or curve in a traveling direction of the vehicle with the use of the position of the vehicle identified by the navigation system and the road information;
a recording unit in which imaging information indicating properties of the imaging device and driver information regarding a visual field of a driver of the vehicle are stored;
a magnifying object recognition unit that recognizes a certain magnifying object in the captured image;
a composing unit that produces, when the magnifying object recognition unit recognizes the certain magnifying object, a composite image of a magnified image off of the magnifying object and the captured image; and a display unit that displays the composite image produced by the composing unit, wherein the composing unit uses the distance obtained by the vehicle information input unit as well as the imaging information and the driver information stored in the recording unit to determine a non-blind spot area in the captured image that does not include an image of a blind spot for the driver, and produces the composite image such that the magnified image is superimposed on the non-blind spot area.

* * * * *